United States Patent
Iwaki et al.

(10) Patent No.: US 9,248,737 B2
(45) Date of Patent: Feb. 2, 2016

(54) TRANSMISSION FOR WORKING VEHICLE

(71) Applicant: KANZAKI KOKYUKOKI MFG. CO., LTD., Amagaski-shi (JP)

(72) Inventors: Koji Iwaki, Amagasaki (JP); Akihiro Ima, Amagasaki (JP); Toshifumi Yasuda, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 14/627,761

(22) Filed: Feb. 20, 2015

(65) Prior Publication Data
US 2015/0239344 A1 Aug. 27, 2015

(30) Foreign Application Priority Data

Feb. 21, 2014 (JP) .................................. 2014-032303
May 29, 2014 (JP) .................................. 2014-111684

(51) Int. Cl.
| | |
|---|---|
| *B60K 25/08* | (2006.01) |
| *B60K 17/04* | (2006.01) |
| *B62D 11/04* | (2006.01) |
| *B60K 5/02* | (2006.01) |
| *B60K 17/10* | (2006.01) |
| *B60K 17/28* | (2006.01) |

(52) U.S. Cl.
CPC . *B60K 17/04* (2013.01); *B60K 5/02* (2013.01); *B60K 17/105* (2013.01); *B60K 17/28* (2013.01); *B62D 11/04* (2013.01)

(58) Field of Classification Search
USPC ............ 180/53.6, 53.61, 53.62, 53.7; 474/61; 475/22
See application file for complete search history.

(56) References Cited

U.S. PATENT DOCUMENTS

| | | | |
|---|---|---|---|
| 2002/0043057 A1* | 4/2002 | Shiba ................... | B60K 5/1208 56/1 |
| 2003/0070848 A1* | 4/2003 | Hasegawa .............. | B60K 17/06 180/53.1 |
| 2003/0162618 A1* | 8/2003 | Hasegawa ................ | B60K 5/00 475/72 |
| 2003/0188909 A1 | 10/2003 | Ohashi et al. | |
| 2004/0237490 A1* | 12/2004 | Yasuda .............. | A01D 34/6806 56/10.8 |
| 2005/0016304 A1* | 1/2005 | Ishii ....................... | B60K 17/28 74/15.4 |
| 2006/0042843 A1* | 3/2006 | Yasuda ................ | A01D 69/002 180/65.1 |
| 2007/0245726 A1* | 10/2007 | Iwaki ..................... | B60K 17/30 60/487 |
| 2008/0210482 A1* | 9/2008 | Ishii ....................... | A01D 69/03 180/242 |
| 2009/0025997 A1* | 1/2009 | Ishii ....................... | A01D 69/03 180/242 |

\* cited by examiner

*Primary Examiner* — Toan To
(74) *Attorney, Agent, or Firm* — Sterne, Kessler, Goldstein & Fox P.L.L.C.

(57) ABSTRACT

A transmission for a working vehicle equipped with an engine having a horizontal engine output shaft, pair of transaxles for driving right and left drive wheels at variable speeds, and working device comprises a horizontal input shaft, output shaft, first gear train, horizontal PTO shaft, second gear train, PTO clutch and casing. An axial end of the input shaft connects to a flywheel of the engine. The output shaft drivingly connects to the transaxles. The first gear train transmits power from the input shaft to the output shaft. The PTO shaft extends parallel to the input shaft, and is provided with a universal joint connected to the working device. The second gear train transmits power from the input shaft to the PTO shaft via the PTO clutch. The casing supports the input and output shafts and incorporates the first and second gear trains and the PTO clutch.

6 Claims, 11 Drawing Sheets

TRANSMISSION FOR WORKING VEHICLE

CROSS-REFERENCE TO RELATED APPLICATIONS

The present application claims priority to Japanese Patent Applications No. 2014-032303, filed on Feb. 21, 2014, and No. 2014-111684, filed on May 29, 2014.

BACKGROUND OF THE INVENTION

1. Field of the Invention

The present invention relates to a transmission adapted for a working vehicle, which is equipped with an engine (referred to as a "horizontal engine") having a horizontal output shaft, a pair of transaxles for driving respective right and left drive wheels, and a working device.

2. Related Art

There is a well-known conventional vehicle, referred to as a "zero-turn vehicle", which is equipped with right and left transaxles carrying respective right and left axles so as to individually drive the respective axles. US 2003/0188909 A discloses a mower tractor (riding lawn mower) as one of such zero-turn vehicles. This mower tractor is equipped with an engine having a horizontal engine output shaft, and a transmission continuing to the engine. This transmission has a horizontal input shaft connected to the engine output shaft, and has a PTO shaft for driving a mower unit serving as the working device. The PTO shaft is extended coaxially to the input shaft and horizontally in correspondence to a horizontal input shaft of the mower unit. The input shaft of the transmission projects outward from an outside end of a casing of the transmission toward the engine, while the PTO shaft projects outward from another outside end of the casing opposite the engine.

The right and left transaxles include respective hydraulic motors for driving the respective axles. A pair of hydraulic pumps are disposed in the casing of the transmission so as to supply hydraulic fluid to the respective hydraulic motors of the right and left transaxles. The supply of hydraulic fluid from the respective hydraulic pumps to the respective hydraulic motors depends on pipes. A gear train for driving these hydraulic pumps is disposed in the casing of the transmission so as to transmit power from the input shaft to pump shafts of the hydraulic pumps. Also, in the casing, a clutch for the PTO shaft is interposed between a final gear of the gear train and the PTO shaft, and a brake for preventing inertial rotation of the PTO shaft is provided interlockingly with the clutch.

A vehicle such as disclosed by US 2003/0188909 A tends to have a large transmission because of the above-mentioned arrangement of the two hydraulic pumps. If a vehicle has a narrowed space close to the engine, it is hard to arrange this type of transmission in the space. Further, pipes are needed to fluidly connect the hydraulic pumps of the transmission to the hydraulic motors of the transaxles. Piping of the pipes needs labor and space.

Then, distribution of the hydraulic pumps such that each of the transaxles includes the hydraulic pump together with the hydraulic motor is suggested. This distribution of the hydraulic pumps between the transaxles will make the pipes unnecessary and will make the transmission compact. In the case where each of the right and left transaxles includes the respective hydraulic pump and motor, the transmission has to be reconfigured suitably to drive the transaxles.

SUMMARY OF THE INVENTION

An object of the invention is to provide an appropriate transmission adapted to a working vehicle, such as a zero-turn vehicle as mentioned above, equipped with right and left transaxles each of which includes a hydraulic pump and a hydraulic motor, whereby the transmission transmits power from a prime mover, such as an engine, to the right and left transaxles and a working device.

To achieve the object, a working vehicle is equipped with an engine having a horizontal engine output shaft, a pair of transaxles for driving respective right and left drive wheels at variable speeds, and a working device, and a transmission for the working vehicle comprises a horizontal input shaft, an output shaft, a first gear train, a horizontal PTO shaft, a second gear train, a PTO clutch and a casing. An axial end of the input shaft serves as a joint configured to connect to a flywheel of the engine. The output shaft is configured to drivingly connect to the transaxles. The first gear train transmits power from the input shaft to the output shaft. The PTO shaft is extended parallel to the input shaft, and is provided with a universal joint configured to connect to the working device. The second gear train transmits power from the input shaft to the PTO shaft. The PTO clutch makes and cuts off a power transmission between the input shaft and the PTO shaft. The common casing supports the input shaft and the output shaft and incorporates the first and second gear trains and the PTO clutch.

Therefore, the transmission including the input shaft for receiving power from the engine, the output shaft for outputting power to the pair of transaxles, and the PTO shaft for outputting power to the working device, also includes the axial end of the input shaft serving as the joint, and the universal joint on the PTO shaft, thereby facilitating coupling of the flywheel of the engine to the input shaft, coupling of the output shafts to the pair of transaxles, and coupling of the PTO shaft to the working device, whereby a power train from the horizontal engine having the horizontal output shaft to the pair of transaxles and the working device can be easily configured in the working vehicle. Further, due to the horizontal input shaft corresponding to the engine output shaft, and the horizontal PTO shaft parallel to the input shaft, a propeller shaft and another universal joint can be easily used to couple the universal joint on the PTO shaft to an input shaft of the working device if the working device, e.g., a mower unit, has the input shaft extended horizontally.

Preferably, the casing is provided at a side end thereof with a mounting flange to be joined to the engine.

Therefore, the side end of the casing can easily be joined to the engine, so that the transmission can easily be mounted onto the engine when the input shaft is coupled to the flywheel.

Preferably, the first gear train has a gear ratio such as to substantially equalize a rotary speed of the output shaft to a rotary speed of the input shaft. The second gear train has a gear ratio such as to make a rotary speed of the PTO shaft less than the rotary speed of the input shaft.

Therefore, due to the gear ratio of the first gear train such as to substantially equalize the rotary speed of the output shaft to the rotary speed of the input shaft, the output shaft of the transmission can be rotated at a considerably high speed so as to input rotary power to the transaxles for rotating drive wheels at an appropriate speed. On the other hand, due to the gear ratio of the second gear train such as to make the rotary speed of the PTO shaft less than the rotary speed of the input shaft, i.e., since the second gear train is a reduction gear train, the working device can receive an appropriate input rotary power from the PTO shaft with a high torque at a low speed suitable for work by the working device.

Preferably, the first gear train includes a pair of bevel gears, so that the output shaft drivingly connected to the input shaft via the first gear train is extended parallel to input shafts of the respective transaxles and is drivingly connected to the input shafts of the transaxles via a belt.

Therefore, due to the bevel gears of the first gear train, the output shaft of the transmission is arranged suitably for its driving connection to input shafts of the transaxles especially if the input shafts of the transaxles are parallel to each other, e.g., if the input shafts of the right and left transaxles are vertical at an even height.

Preferably, the casing is provided with a vertically downwardly extended portion at an end thereof opposite the engine, so that the vertically downwardly extended portion supports the PTO shaft. The output shaft is journalled vertically at a portion of the casing between an end of the casing to be joined to the engine and the vertically downwardly extended portion.

Therefore, due to the vertical output shaft, a belt and pulleys can easily be used to drivingly connect the output shaft to input shafts of the transaxles if the input shafts of the transaxles are vertical. Further, due to the extended portion of the casing, the height of the PTO shaft becomes appropriate for its driving connection to the working device if the working device, e.g., a mower unit, has an input shaft at a considerably low position. If a propeller shaft and another universal joint are used to drivingly connect the PTO shaft to the input shaft of the working device, an angle of the propeller shaft relative to the PTO shaft and the input shaft of the working device can be small so as to enhance the power transmission efficiency. Further, due to the extended portion of the casing, a space below the casing can be expanded along the extended portion of the casing so that the vertical output shaft can project downward from the casing into the space below the casing, and a belt and pulleys can be disposed in this space to drivingly connect the output shaft to the transaxles.

Alternatively, preferably, a pair of horizontal output shafts each of which serves as said output shaft are extended laterally of the working vehicle and project laterally outward from right and left ends of the casing. The first gear train includes a first bevel gear fixed on the input shaft of the transmission and second bevel gears fixed on the respective output shafts and meshing with the first bevel gear, so that the output shafts drivingly connected to the input shaft via the first gear train are extended coaxially to respective input shafts of the transaxles so as to be drivingly connected to the respective input shafts of the transaxles.

Therefore, due to the pair of horizontal output shafts extended laterally of the working vehicle and projecting laterally outward from right and left ends of the casing, splined sleeves, for example, can easily be used to drivingly connect the output shafts of the transmission to input shafts of the transaxles if the input shafts of the transaxles are horizontal and coaxial to the output shafts of the transmission. Further, due to the first gear train including the first bevel gear fixed on the input shaft of the transmission and the second bevel gears fixed on the respective output shafts and meshing with the first bevel gear, component members of the first gear train is reduced in number so as to minimize the entire first gear train, and the minimized first gear train reduces a difference in height between the input shaft of the transmission and the output shafts of the transmission. Further, while the input shafts of the transaxles are connected to the respective output shafts of the transmission coaxial to the input shafts of the transaxles, location of the first bevel gear on the input shaft in the fore-and-aft direction directly leads to location of the second bevel gears on the output shafts in the fore-and-aft direction so as to determine the fore-and-aft, whereby the transmission and the transaxles can be joined together with small gaps, i.e., a compact power transmission assembly including the transmission and the transaxles can be configured.

These and other objects, features and advantages of the invention will appear more fully from the following detailed description of the invention with reference to the attached drawings.

DETAILED DESCRIPTION OF THE INVENTION

Figure 1:
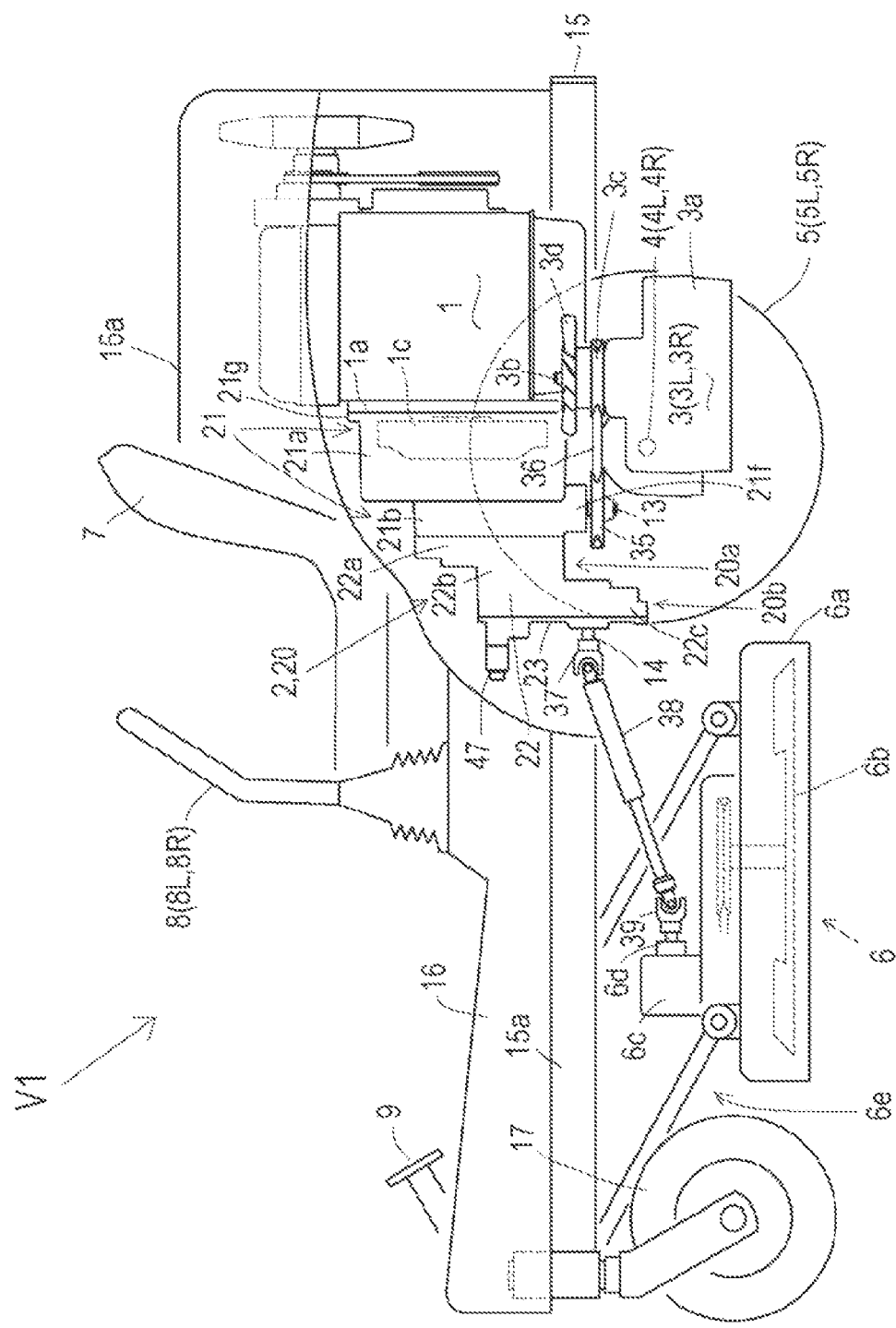
FIG. 1 is a schematic side view of a mower tractor (riding lawn mower) serving as a working vehicle equipped with a transmission according to a first embodiment.
Figure 2:
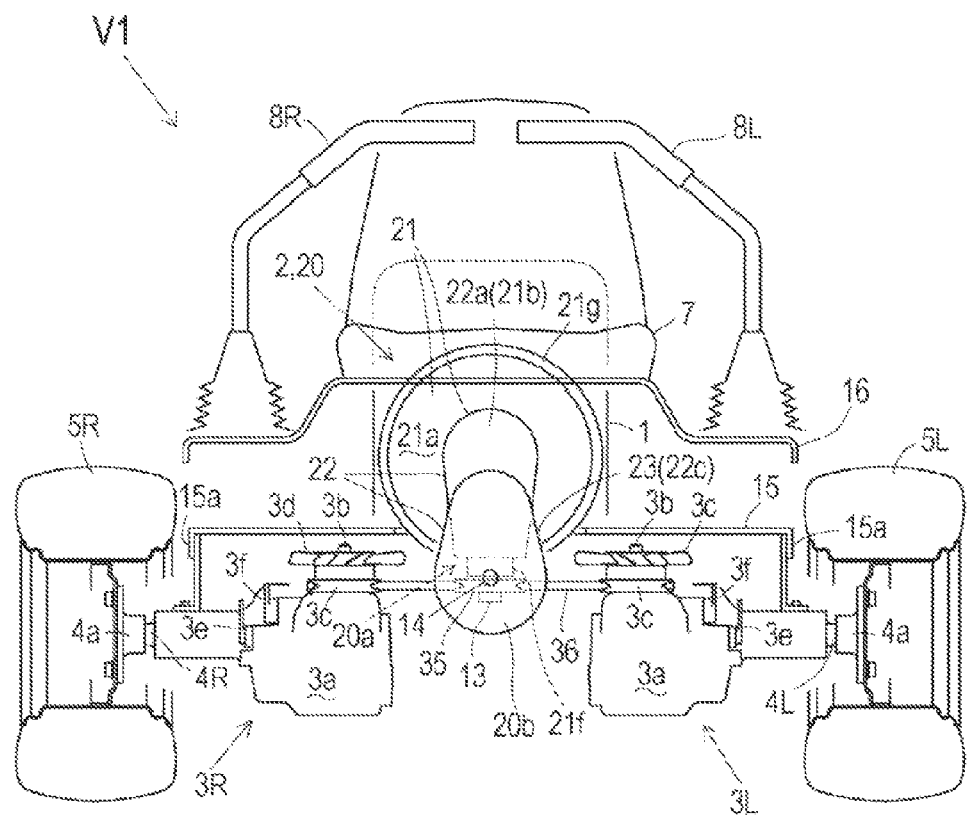
FIG. 2 is a schematic front view of the mower tractor of FIG. 1.

An embodiment shown in FIGS. 1 to 3 will be described. FIGS. 1 and 2 illustrate a mower tractor (hereinafter referred to as "vehicle") V1 serving as an embodiment of a zero-turn working vehicle equipped with an engine having a fore-and-aft horizontal engine output shaft. A general structure of vehicle V1 will be described with reference to FIGS. 1 and 2. Vehicle V1 includes a vehicle body frame 15 extended from a front end thereof to a rear end thereof. Castors 17 serving as front wheels of vehicle V1 are carried at a front end of vehicle body frame 15. An upper portion of vehicle body frame 15 is covered with a vehicle body cover 16. An operator's seat 7 is mounted at a fore-and-aft center portion of vehicle V1 above vehicle body cover 16. Right and left control levers 8R and 8L, generally referred to as "control levers 8", are disposed at right and left sides of seat 7. A brake pedal 9 is disposed forward from seat 7.

A portion of vehicle body cover 16 rearward from seat 7 defines an engine room 16a in which an engine 1 is mounted on vehicle body frame 15. Engine 1 is the so-called "horizontal engine". In this regard, engine 1 includes a fore-and-aft horizontal engine output shaft 1b (see FIG. 3) projecting forward from a front side end 1a of engine 1. A flywheel 1c is fixed on engine output shaft 1b. A casing 20 of a transmission 2 is joined to front side end 1a of engine 1. Therefore, transmission 2 is extended forward from engine 1, and flywheel 1c is disposed in casing 20.

Vehicle body frame 15 is formed with right and left side plate portions 15a extended in the fore-and-aft direction. Right and left transaxles 3R and 3L, generally referred to as "transaxles 3", are hung down from right and left side plate portions 15a, respectively. Right and left transaxles 3R and 3L carry respective right and left axles 4R and 4L, generally referred to as "axles 4". Axles 4R and 4L project distally in the lateral direction of vehicle V1 so as to have respective hubs 4a at respective distal ends thereof. Hubs 4a are fixed to central portions of respective right and left drive wheels 5R and 5L, generally referred to as "drive wheels 5", serving as rear wheels of vehicle V1.

Transaxles 3 include respective casings 3a each of which incorporates an unshown stepless transmission including a hydraulic pump and a hydraulic motor. The hydraulic motors drive respective axles 4. The hydraulic pumps supply fluid to the respective hydraulic motors so as to drive the respective hydraulic motors. A pump shaft of each of the hydraulic pumps projects upward from casing 3a so as to serve as an input shaft 3b of corresponding transaxle 3. An input pulley 3c and a cooling fan 3d are fixed on a top portion of each input shaft 3b.

As shown in FIG. 2, a speed control arm 3e and a brake arm 3f are disposed on a distal outside of casing 3a of each of right and left transaxles 3. Speed control arm 3e is operatively connected to a speed control section, e.g., a movable swash plate of the hydraulic pump, in casing 3a, so that speed control arm 3e is rotatable to control the rotary speed and direction of corresponding axle 4. The rotation of speed control arm 3e of each of right and left transaxles 3R and 3L depends on the operation degree and direction of each of right and left control levers 8R and 8L. For example, if right speed control lever 8R is located at a forward traveling speed position and left speed control lever 8L is located at a backward traveling speed position for a backward traveling speed equal to a forward traveling speed corresponding to the forward traveling speed position of right control lever 8R, axle 4R of right transaxle 3R rotates forward and axle 4L of left transaxle 3R rotates backward at a speed equal to a forward rotation speed of axle 4R, thereby making vehicle V1 zero-turn counterclockwise. Vehicle V1 is referred to as the "zero-turn working vehicle" as mentioned above because vehicle V1 is able to zero-turn in this way.

Regarding how to operatively connect right and left control levers 8R and 8L to respective speed control arms 3e of right and left transaxles 3R and 3L, vehicle V1 may be provided with a controller that controls actuators based on position detection signals from respective control levers 8R and 8L so as to control the rotations of speed control arms 3e. Alternatively, speed control arms 3e of right and left transaxles 3R and 3L may be mechanically interlockingly connected to respective control levers 8R and 8L via mechanical links.

Brake arms 3f of right and left transaxles 3R and 3L are interlockingly connected to brakes in respective casings 3a so that rotation of each brake arm 3f switches the corresponding brake between a braking state and an unbraking state. When brake pedal 9 is depressed, brake arms 3f of right and left transaxles 3R and 3L are rotated simultaneously so as to brake both right and left axles 4R and 4L simultaneously.

A mower unit 6 is hung down from a front portion of vehicle body frame 15 via a lifting link 6e, and is disposed in a space below vehicle body frame 15 between castors 17 serving as the front wheels and drive wheels 5R and 5L serving as the rear wheels. Mower unit 6 includes a mower deck 6a and vertically axial rotary blades 6b disposed in mower deck 6a. A gearbox 6c is mounted on an upper portion of mower deck 6a. A fore-and-aft horizontal input shaft 6d of mower unit 6 projects forward from gearbox 6c. Horizontal input shaft 6d is drivingly connected to vertically axial rotary blades 6b via gears in gearbox 6c.

Figure 3:
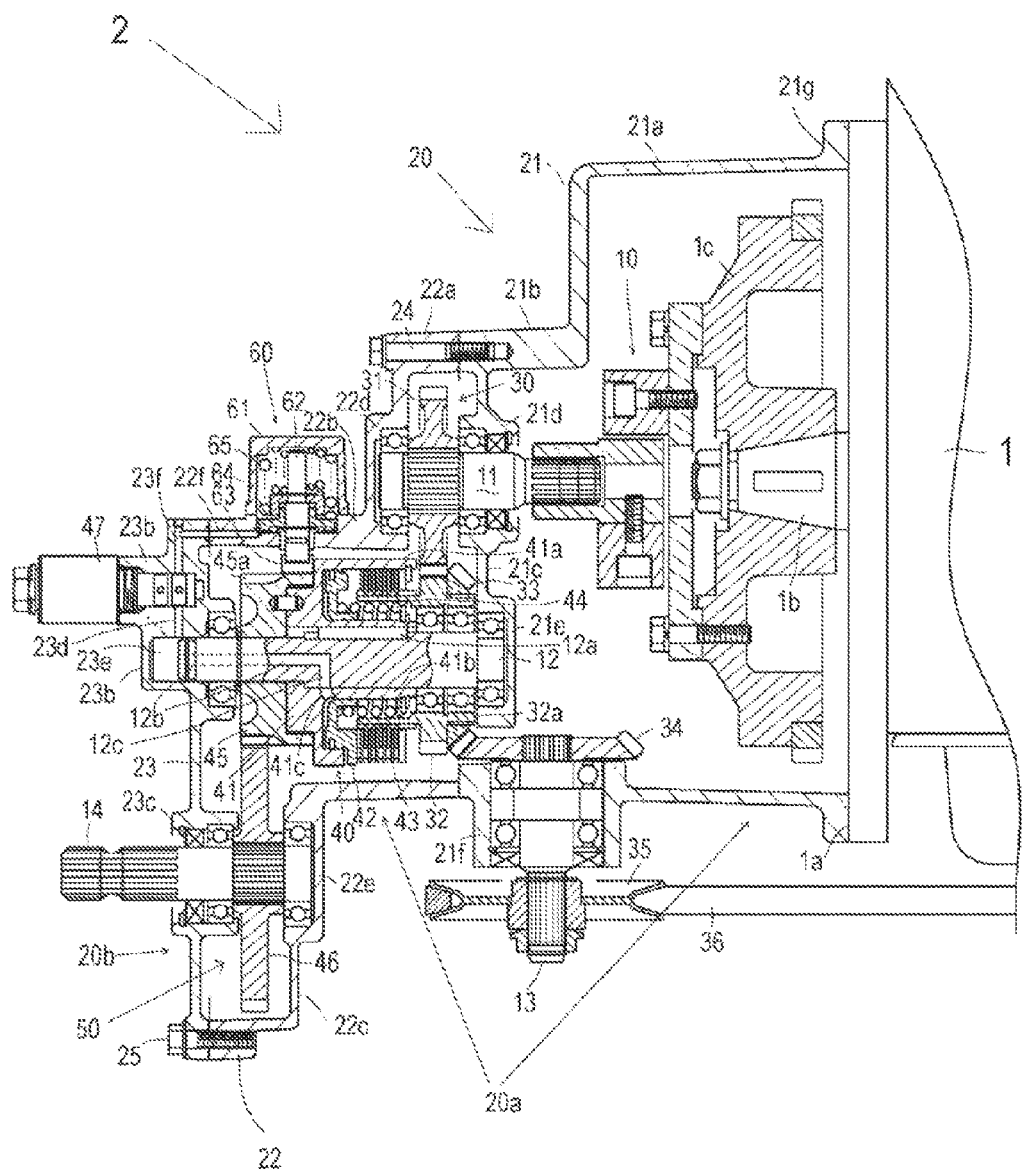
FIG. 3 is a sectional side view of the transmission according to the first embodiment.

Referring to FIG. 1 to 3, a configuration of transmission 2 will be described, and description will further be given of configurations for drivingly connecting an output shaft 13 of transmission 2 to input shafts 3b of transaxles 3R and 3L and for drivingly connecting a PTO shaft 14 of transmission 2 to input shaft 6d of mower unit 6.

Casing 20 of transmission 2 includes divisional housings 21, 22 and 23 continuing in the fore-and-aft direction. In this regard, a rear end of middle housing 22 is fastened to a front end of rear housing 21 via bolts 24, and front housing 23 is fastened to a front end of middle housing 22 via bolts 25, so that housings 21, 22 and 23 are joined to constitute casing 20.

A rear portion of rear housing 21 is formed circular when viewed in front so as to serve as a flywheel housing portion 21a. A front portion of rear housing 21 is formed narrower in the lateral direction than flywheel housing portion 21a so as to be vertically longer than it is wide in the lateral direction, thereby serving as a bearing housing portion 21b. An open rear end of flywheel housing portion 21a corresponds to a rear end of casing 20 that is joined to front side end 1a of engine 1. The open rear end of flywheel housing portion 21a is formed with a mounting flange 21g. When mounting flange 21g of flywheel housing portion 21a is joined to front side end 1a of engine 1, a flywheel 1c is disposed in flywheel housing portion 21a.

Bearing housing portion 21b is formed so as to extend forward from flywheel housing portion 21a. An entire bottom portion of rear housing 21 from flywheel housing portion 21a to bearing housing portion 21b is even in height except for a later-discussed output shaft bearing portion 21f. A top portion of bearing housing portion 21b is lower than a top portion of flywheel housing portion 21a so that an upper portion of rear housing 21 is stepped when viewed in side, as shown in FIGS. 1 and 3.

A vertical bearing wall 21c is formed inside of bearing housing portion 21b. An upper portion of bearing wall 21c is formed with an input shaft bearing portion 21d expanded in the fore-and-aft direction. A lower portion of bearing wall 21c is formed with a PTO clutch shaft bearing portion 21e expanded in the fore-and-aft direction. A bottom end of bearing wall 21c is disposed above the bottom of bearing housing portion 21b. Output shaft bearing portion 21f is formed on the bottom portion of bearing housing portion 21b so as to expand vertically. A gap between a top end of output shaft bearing portion 21f and the bottom end of bearing wall 21c serves as a space in which a bevel gear 34 is disposed so as to mesh with a bevel gear 33 in middle housing 22 as detailed later.

A rear end portion of middle housing 22 is formed as a first gear housing portion 22a vertically longer than it is laterally wide so as to correspond to the shape of the front end of bearing housing portion 21b of rear housing 21. A front end portion of middle housing 22 is also formed vertically longer than it is laterally wide so as to serve as a second gear housing portion 22c. A fore-and-aft intermediate portion of middle housing 22 between first and second gear housing portions 22a and 22c is formed cylindrical in the fore-and-aft direction so as to serve as a clutch housing portion 22b. In the condition that middle housing 22 is joined to rear housing 21, a top end of first gear housing portion 22a is even in height with the top end of bearing housing portion 21b of rear housing 21, and rear ends of first gear housing portion 22a and clutch housing portion 22b are even in height with the bottom end of rear housing 21 (except for output shaft bearing portion 21f), so that the bottom end of rear housing 21 and the bottom ends of first gear housing portion 22a and clutch housing portion 22b define a bottom portion 20a of casing 20. Therefore, output shaft bearing portion 21f is extended vertically downward from a fore-and-aft intermediate portion of bottom portion 20a of casing 20.

The top end of clutch housing portion 22b and the top end of second gear housing portion 22c are even in height, however, they are lower than the top end of first gear housing portion 22a (and the top end of bearing housing portion 21b of rear housing 21) by a step so as to form a vertical front end wall of first gear housing portion 22a serving as an input shaft bearing portion 22d.

A bottom end of second gear housing portion 22c is lower than the bottom ends of first gear housing portion 22a and clutch housing portion 22b, i.e., bottom portion 20a of casing 20 by a step so as to form a vertical rear end wall of second gear housing portion 22c serving as PTO shaft bearing portion 22e.

Front housing 23 is a plate-shaped member that is also vertically longer than it is laterally wide so as to correspond to the shape of a front end of second gear housing portion 22c of middle housing 22. In the condition that front housing 23 is joined to middle housing 22, a top end of front housing 23 is even in height with the top ends of clutch housing portion 22b and second gear housing 22c of middle housing 22, and a bottom end of front housing 23 is even in height with the bottom end of second gear housing portion 22c. An upper portion of front housing 23 expanded in the fore-and-aft direction is formed with a PTO clutch shaft bearing portion 23a, and with a valve mounting portion 23b closed to PTO clutch shaft bearing portion 23a. A PTO shaft bearing portion 23c expanded in the fore-and-aft direction is formed on a lower portion of casing 20 lower than bottom portion 20a of casing 20.

Accordingly, bottom ends of front housing 23 and second gear housing portion 22c of middle housing 22 are lower than bottom portion 20a of casing 20 so that the lower portion of second gear housing portion 22c formed with PTO shaft bearing portion 22e and the lower portion of front housing 23 formed with PTO shaft bearing portion 23c are extended downward from bottom portion 20a of casing 20. These lower portions of second gear housing portion 22c and front housing 23, including PTO shaft bearing portions 22e and 23c, constitute an extended portion 20b of casing 20 defined as being extended downward from bottom portion 20a of casing 20. In other words, bottom portion 20a of casing 20 is provided at a front end portion thereof with further downwardly extended portion 20b. Therefore, a space outside casing 20 below bottom portion 20a and rearward from extended portion 20b is used for arranging output shaft bearing portion 21f projecting downward from bottom portion 20a.

In casing 20, an input shaft 11 is extended horizontally in the fore-and-aft direction, is journalled at a front end thereof by input shaft bearing portion 22d of middle housing 22 via a bearing, and is journalled at an axial intermediate portion thereof by input shaft bearing portion 21d of rear housing 21 via a bearing. A rear portion of input shaft 11 is extended rearward from input shaft bearing portion 21d so that a rear end of input shaft 11 is coupled to a front end of flywheel 1c disposed in flywheel housing portion 21a via a damper 10.

A PTO clutch shaft 12 is extended horizontally in the fore-and-aft direction through clutch housing portion 22b and is extend forward and rearward from clutch housing portion 22b, so that PTO clutch shaft 12 is journalled at a front end thereof by PTO clutch shaft bearing portion 23a of front housing 23 via a bearing, and is journalled at a rear end thereof by PTO clutch shaft bearing portion 21e of rear housing 21 via a bearing. Accordingly, PTO shaft is disposed vertically downward from input shaft 11 and is extended parallel to input shaft 11.

In a chamber defined by first gear housing portion 22a immediately forward from bearing wall 21c, a spur gear 31 is fixed on input shaft 11, and a spur gear 32 is fitted on PTO clutch shaft 12 via a bearing. Spur gears 31 and 32 mesh with each other. Spur gear 32 is formed with a central boss portion 32a extended rearward. A bevel gear 33 is fixed on a rear end of central boss portion 32a along a rear end surface of spur gear 32.

A vertical output shaft 13 is journalled by output shaft bearing portion 21f via bearings. A top end of output shaft 13 projects upward from a top end of output shaft bearing portion 21f in casing 20 (rear housing 21). A bevel gear 34 is fixed on the top end of output shaft 13. A lower portion of bevel gear 33 and a front portion of bevel gear 34 mesh with each other. The gap between the bottom end of bearing wall 21c and the top end of output shaft bearing portion 21f serves as a space for meshing of the lower portion of bevel gear 33 disposed forward from bearing wall 21c with the front portion of bevel gear 34 fixed on the top end of output shaft 13 disposed rearward from bearing wall 21c.

In this way, spur gears 31 and 32 and bevel gears 33 and 34 constitute a first gear train 30 for transmitting power of engine 1 from input shaft 11 to output shaft 13. The driving power of first gear train 30 is transmitted to PTO clutch shaft 12 as long as a later-discussed PTO clutch 40 is engaged. On the other hand, spur gear 32 and bevel gear 33 fixed to spur gear 32 are fitted to PTO clutch shaft 12 via the bearing so that gears 32 and 33 are rotatable relative to PTO clutch shaft 12. Therefore, first gear train 30 transmits power from input shaft 11 to output shaft 13 regardless of whether or not the driving power of first gear train 30 is transmitted to PTO clutch shaft 12, i.e., whether or not PTO clutch shaft 12 is rotated.

In this embodiment, teeth of spur gear 31 are substantially as many as teeth of spur gear 32, and teeth of bevel gear 33 are substantially as many as teeth of bevel gear 34, so that first gear train 30 serves as a speed equalizing gear train that equalizes the rotary speed of output shaft 13 to the rotary speed of input shaft 11. In other words, a gear ratio of first gear train 30, i.e., a rotary speed ratio of output shaft 13 to input shaft 11, is set so that a rotary power is kept to have a constant speed while it is transmitted from input shaft 11 to output shaft 13. Therefore, such a considerably high rotary speed of input shaft 11 (i.e., engine output shaft 1b) is kept to be used for rotating drive wheels 5 at an appropriate speed for traveling of vehicle V1.

A pulley 35 is fixed on a bottom portion of output shaft 13 projecting a bottom end of output shaft bearing portion 21f. A belt 36 is looped over input pulleys 3c fixed on respective input shafts 3b of right and left transaxles 3R and 3L. Therefore, belt 36 looped over pulley 35 and right and left pulleys 3c so as to constitute a driving connection system for transmitting power from transmission 2 to right and left transaxles 3R and 3L. The space rearward from extended portion 20b of casing 20 of transmission 2, below bottom portion 20a of casing 20 of transmission 2 and below engine 1 is used for arranging the driving connection system including pulleys 35 and 3c and belt 36.

In an upper portion of a chamber defined by second gear housing portion 22c of middle housing 22, a gear member 45 is fixed on PTO clutch shaft 12, and is fixed to a front end portion of a later-discussed clutch drum 41 of PTO clutch 40.

Gear member 45 is formed with a spur gear 45a that meshes with a later-discussed spur gear 46

PTO shaft bearing portion 22e of middle housing 22 journals a rear end of fore-and-aft horizontal PTO shaft 14 via a bearing. PTO shaft bearing portion 23c of front housing 23 journals an axial intermediate portion of PTO shaft 14 via a bearing. A front end portion of PTO shaft 14 projects forward from PTO shaft bearing portion 23c (i.e., extended portion 20b of casing 20) opposite engine 1. Accordingly, PTO shaft 14 is disposed vertically below PTO clutch shaft 12, and is extended parallel to PTO clutch shaft 12 (and input shaft 11).

In a lower portion of the chamber defined by second gear housing portion 22c of middle housing 22, spur gear 46 is fixed on PTO shaft 14 so that a top portion of spur gear 46 meshes with a bottom portion of spur gear 45a. Therefore, spur gears 45a and 46 constitute a second gear train 50 for transmitting power to PTO shaft 14. In this embodiment, spur gear 46 is diametrically larger than spur gear 45a, and has more teeth than spur gear 45a, so that second gear train 50 serves as a speed reduction gear train. In other words, a gear ratio of second gear train 50 is set so as to make a rotary speed of PTO shaft 14 less than a rotary speed of gear member 45 (equal to the rotary speed of input shaft 11). Therefore, PTO shaft 14 is rotated at a reduced speed with a high torque such as to appropriately rotate rotary blades 6b of mower unit 6 serving as the working device.

As shown in FIG. 1, a universal joint 37 is fitted on the front end portion of PTO shaft 14 projecting forward from extended portion 20b of casing 20, and is drivingly connected to input shaft 6d of mower unit 6 via a propeller shaft 38 and another universal joint 39. In the fore-and-aft direction of vehicle V1, the space forward from casing 20 is opposite engine 1, so that a driving connection system, including universal joints 37 and 39 and propeller shaft 38, for drivingly connecting PTO shaft 14 to input shaft 6d of mower unit 6 is provided in vehicle V1 safely from interference with engine 1. Further, due to the arrangement of PTO shaft 14 in extended portion 20b of casing 20, PTO shaft 14 is disposed lower than bottom portion 20a of casing 20 so as to be placed at an appropriate height for the driving connection to input shaft 6d of mower unit 6. Therefore, a vertical inclination angle of propeller shaft 38 is reduced so as to enhance the efficiency of power transmission from PTO shaft 14 to input shaft 6d, and so as to reduce noise.

PTO clutch 40 makes and cuts off a power transmission between spur gear 32 of first gear train 30 and spur gear 45a of second gear train 50. When PTO clutch 40 is engaged, power of engine 1 is transmitted from first gear train 30 to second gear train 50 so as to drive PTO shaft 14. When PTO clutch 40 is disengaged, second gear train 50 is isolated from the rotary power of first gear train 30 so as not to drive PTO shaft 14.

Description will be given of a configuration of PTO clutch 40 with description of a hydraulic fluid duct structure formed in transmission 2 for supplying and discharging hydraulic fluid to and from PTO clutch 40. PTO clutch 40 is provided around PTO clutch shaft 12 in a fore-and-aft cylindrical chamber defined by clutch housing portion 22b of middle housing 22. PTO clutch 40 is a hydraulic multi-disc clutch, including clutch drum 41, a piston 42, friction discs 43, and a spring 44. Clutch drum 41 includes a drum portion 41a and a central boss portion 41b. Drum portion 41a is cylindrical in the fore-and-aft direction and is open rearward. Central boss portion 41b is engaged to an outer peripheral surface of PTO clutch shaft 12 via a key 12a so as to be unrotatable relative to PTO clutch shaft 12.

Clutch drum 41 has a space between drum portion 41a and central boss portion 41b. This space serves as a clutch chamber. A central boss portion 32a of spur gear 32 is extended forward and is inserted at a front end portion thereof into the clutch chamber via the rear end opening of clutch drum 41. Friction discs 43 are interposed between drum portion 41a and the front end portion of central boss portion 32a of spur gear 32.

In the clutch chamber of clutch drum 41, forward from friction discs 43, piston 42 is disposed fore-and-aft slidably, and spring 44 is disposed so as to bias piston 42 forward. A space in the chamber forward from piston 42 serves as a clutch fluid chamber that receives hydraulic fluid for engaging PTO clutch 40 when a later-discussed PTO clutch switching valve 47 is controlled to supply the hydraulic fluid to PTO clutch 40.

To engage PTO clutch 40, hydraulic fluid is supplied to the clutch fluid chamber forward from piston 42, so that piston 42 slides rearward by pressure of the hydraulic fluid against spring 44 so as to press friction discs 43 against one another. Therefore, clutch drum 41 is engaged to spur gear 32 unrotatably relative to spur gear 32 so that PTO clutch shaft 12 fixed to clutch drum 41 becomes rotatable integrally with spur gear 32. On the other hand, to disengage PTO clutch 40, hydraulic fluid is discharged from the clutch fluid chamber. In this regard, FIG. 3 illustrates disengaged PTO clutch 40, hydraulic fluid is not supplied to the clutch fluid chamber forward from piston 42, i.e., hydraulic fluid is drained from the clutch fluid chamber so that piston 42 is disposed at its foremost slide position because of the biasing force of spring 44.

An electromagnetic valve serving as PTO clutch switching valve 47 is fitted into valve mounting portion 23b so as to project forward. In this regard, vehicle V1 is provided with a manipulator, such as a switch, for operating PTO clutch 40. PTO clutch switching valve 47 is controlled according to manipulation of this manipulator so as to control supplying and discharging hydraulic fluid to and from the clutch fluid chamber forward from piston 42. A fluid duct structure for flow of fluid between PTO clutch switching valve 47 and PTO clutch 40 will be described.

As mentioned above, front housing 23 is formed with PTO clutch shaft bearing portion 23a for journaling the front end portion of PTO clutch shaft 12. In this regard, a shaft hole 23e is provided in PTO clutch shaft bearing portion 23a, and the front end portion of PTO clutch shaft 12 is inserted into shaft hole 23e. A front portion of shaft hole 23e is extended forward from the front end of PTO clutch shaft 12, and a fluid duct 23d is formed in a wall of valve mounting portion 23b of front housing 23 so as to fluidly connect PTO clutch switching valve 47 to the front portion of shaft hole 23e.

PTO clutch shaft 12 is formed therein with an axial fluid duct 12b and a radial fluid duct 12c. Axial fluid duct 12b is open forward at the front end of PTO clutch shaft 12 to the front portion of shaft hole 23e. Radial fluid duct 12c extends radially from a rear end of axial fluid duct 12b and is open at an outer peripheral surface of PTO clutch shaft 12.

On the other hand, a substantially radial fluid duct 41c is formed in central boss portion 41b of clutch drum 41. An inner end of fluid duct 41c is open at an inner peripheral surface of central boss portion 41b and is joined to the open end of radial fluid duct 12c at the outer peripheral surface of PTO clutch shaft 12. An outer end of fluid duct 41c is open at an outer peripheral surface of central boss portion 41b to the clutch fluid chamber in the clutch chamber of clutch drum 41 forward from piston 42.

A PTO brake 60 is provided in casing 20 (more specifically, middle housing 22) of transmission 2. PTO brake 60 prevents second gear train 50 and PTO shaft 14 from rotating inertially after PTO clutch 40 is disengaged. Therefore, the driving of the working device is stopped as soon as PTO clutch 40 is disengaged. In other words, due to PTO brake 60, the rotation of rotary blades 6b of mower unit 6 is stopped within a predetermined time after PTO clutch 40 is disengaged. A configuration of PTO brake 60 will be described.

PTO brake 60 includes a brake cover 61, a pressure pin 62, a shoe 63, a piston 64 and springs 65. Pressure pin 62 is extended perpendicular to the axial direction of PTO clutch shaft 12, and is reciprocally slidably supported in a wall of casing 20 (i.e., middle housing 22), so that an inner end of pressure pin 62 is able to be pressed against an outer peripheral surface of a rear portion of gear member 45 rearward from spur gear 45a.

Brake cover 61 is provided outside of casing 20 (middle housing 22), and an outer end portion of pressure pin 62 is disposed in a chamber in brake cover 61 outside of casing 20. Piston 64 is provided on pressure pin 62 in the chamber in brake cover 61.

Piston 64 is moved by a hydraulic pressure so as to switch PTO brake 60 between a braking state and an unbraking state. The flow of hydraulic fluid between PTO clutch switching valve 47 and PTO clutch 40 is used to cause a flow of hydraulic fluid for PTO brake 60. Therefore, PTO clutch 40 and PTO brake 60 share common hydraulic fluid, and common PTO clutch switching valve 47 controls supplying and discharging hydraulic fluid to and from both PTO clutch 40 and PTO brake 60. In this regard, fluid ducts 23f and 22f are formed in walls of front housing 23 and middle housing 22 so as to fluidly connect PTO clutch switching valve 47 to the chamber in brake cover 61.

As mentioned above, FIG. 3 illustrates disengaged PTO clutch 40. In this state, the fluid supply from PTO clutch switching valve 47 to the clutch fluid chamber in clutch drum 41 via fluid ducts 23d, 12b, 12c and 41c and the front portion of shaft hole 23e is stopped. At this time, the fluid supply from PTO clutch switching valve 47 to the chamber in brake cover 61 via fluid ducts 23f and 22f is also stopped. Due to springs 65 biasing piston 64 toward gear member 45, the inner end of pressure pin 62 is pressed against the outer peripheral surface of gear member 45 via shoe 63 so as to brake gear member 45 and PTO shaft 14. In other words, when PTO clutch 40 is disengaged, the flow of hydraulic fluid for disengaging PTO clutch 40 is used so that PTO brake 60 is naturally applied to prevent inertial rotation of PTO shaft 14.

When PTO clutch 40 is engaged, PTO clutch switching valve 47 supplies hydraulic fluid to the clutch fluid chamber in clutch drum 41 via fluid ducts 23d, 12b, 12c and 41c and the front portion of shaft hole 23e. Simultaneously, PTO clutch switching valve 47 supplies hydraulic fluid to the chamber in brake cover 61 via fluid ducts 23f and 22f, and this hydraulic fluid causes a hydraulic pressure to move piston 64 away from gear member 45 against springs 65, thereby moving pressure pin 62 away from gear member 45. Accordingly, gear member 45 is released from the pressure of the inner end of pressure pin 62 via shoe 63, so that gear member 45 is rotated by power transmitted to spur gear 32 via engaged PTO clutch 40. In this way, when PTO clutch 40 is engaged, the fluid flow for engaging PTO clutch 40 is used to automatically release PTO brake 60, so that PTO shaft 14 receives power from engine 1 via first gear train 30 and second gear train 50 so as to rotate freely from PTO brake 60.

Another embodiment shown in FIGS. 4 to 11 will now be described, however, detailed description of members and portions shown in FIGS. 4 to 11 and designated by reference numerals also used to designate corresponding members and portions in vehicle V1 shown in FIG. 1 to 3 will be omitted because the members and portions shown in FIGS. 4 to 11 are identical to the corresponding members and portions in vehicle V1 or function as the corresponding members and portions in vehicle V1.

Figure 4:
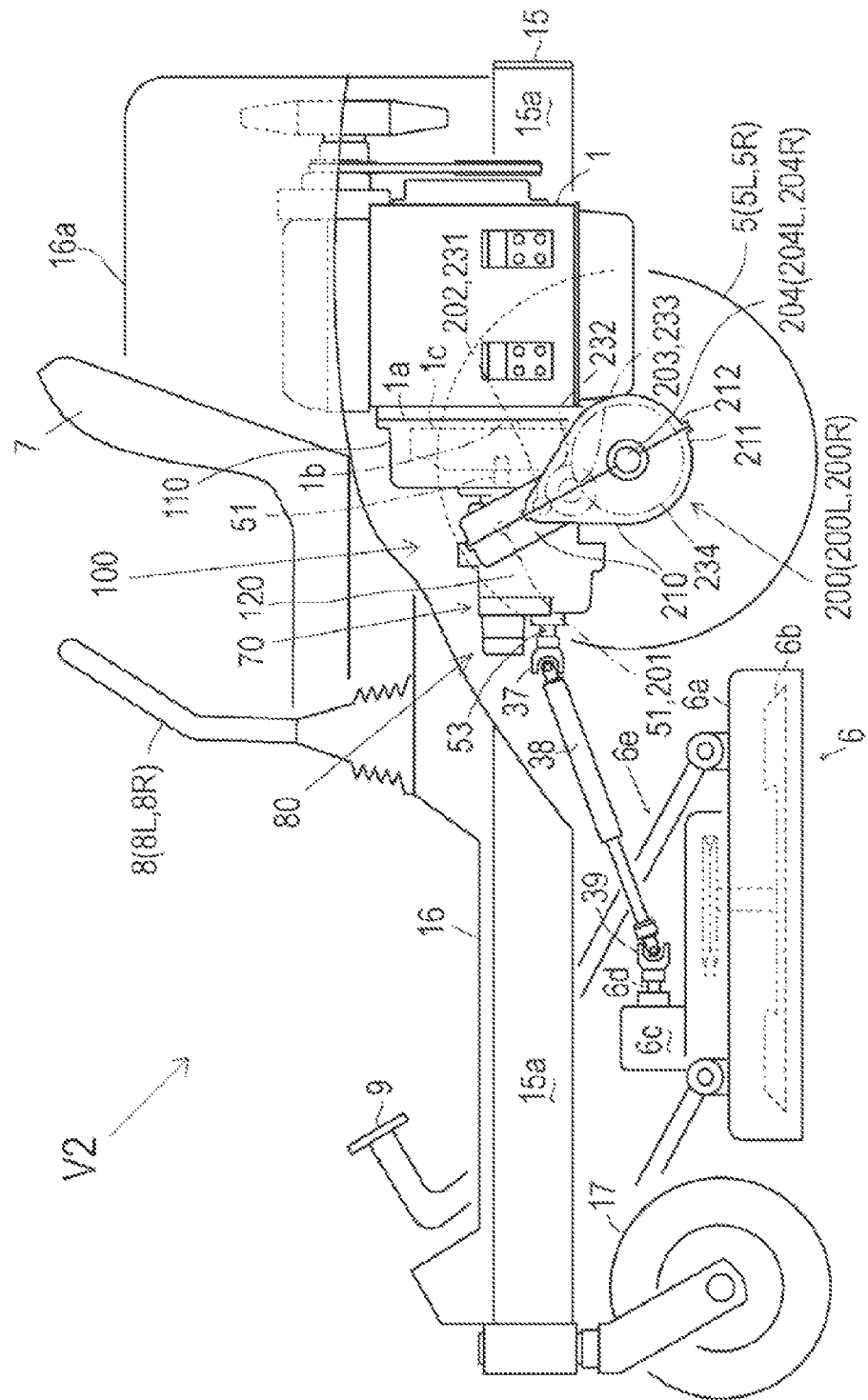
FIG. 4 is a schematic side view of a mower tractor (riding lawn mower) serving as a working vehicle equipped with a transmission according to a second embodiment.
Figure 5:
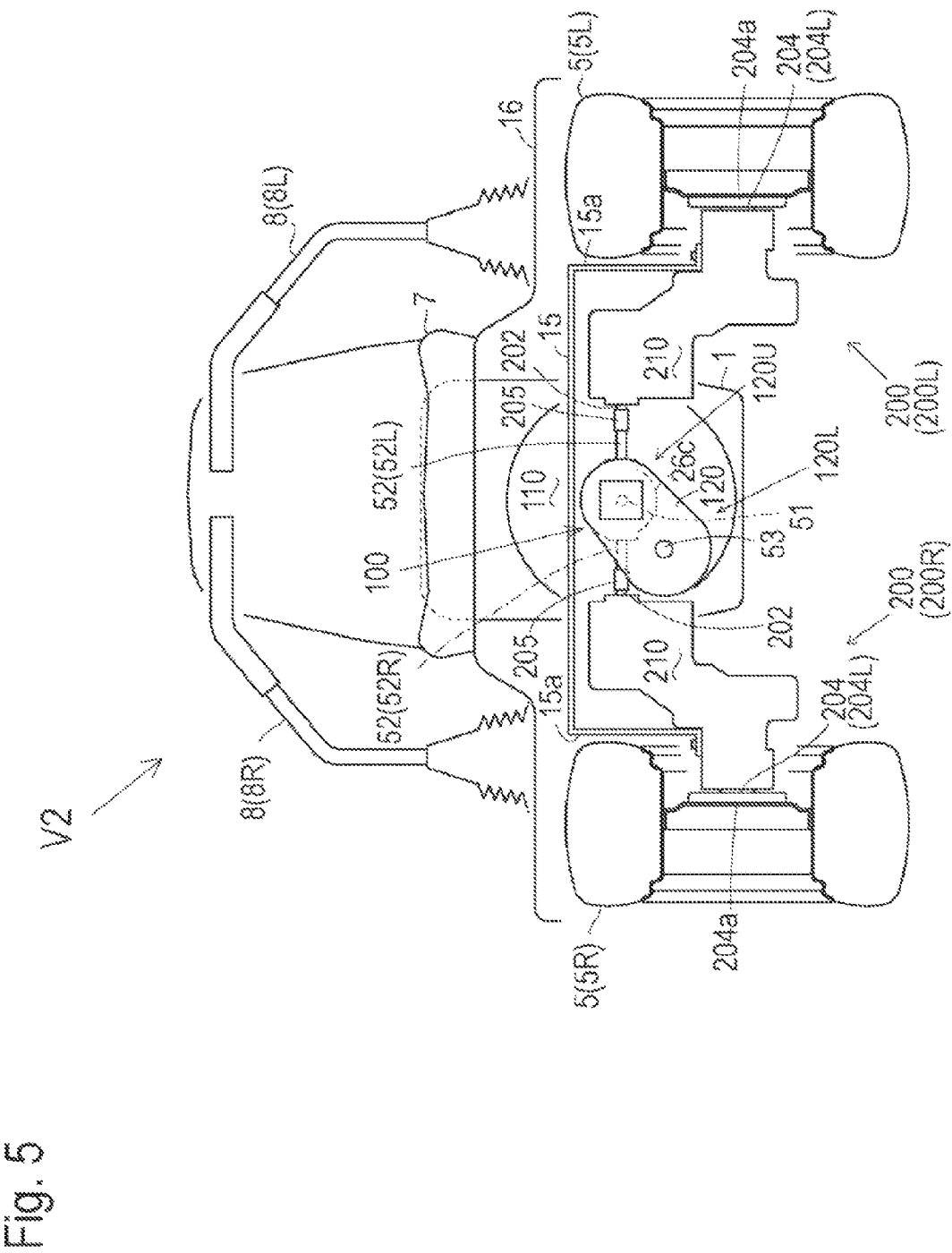
FIG. 5 is a schematic front view of the mower tractor of FIG. 4.

FIGS. 4 and 5 illustrate a mower tractor (hereinafter, simply referred to as "vehicle") V2 serving as another embodiment of a zero-turn working vehicle equipped with an engine having a fore-and-aft horizontal engine output shaft. Vehicle V2 is provided with right and left transaxles 200R and 200L, generally referred to as "transaxles 200", which carry and drive respective axles 204R and 204L, generally referred to as "axles 204", joined to right and left drive wheels 5R and 5L. Transaxles 200 are hung down from right and left side plate portions 15a, respectively. Each transaxle 200 includes a casing 210 carrying axle 204. Casing 210 incorporates a hydrostatic stepless transmission (hereinafter referred to as "HST") 220 and a reduction gear train 230 transmitting power from HST 220 to axle 204.

Vehicle V2 is equipped with mower unit 6 including fore-and-aft horizontal input shaft 6d, similarly to vehicle V1. Each of right and left transaxles 200 includes a laterally horizontal input shaft (pump shaft) 201. Vehicle V2 is provided with a transmission 100 for transmitting power from fore-and-aft horizontal engine output shaft 1b of engine 1 to input shafts 201 of right and left transaxles 200 and input shaft 6d of mower unit 6. Transmission 100 includes a casing 120. A fore-and-aft horizontal input shaft 51, right and left lateral horizontal output shafts 52 and a fore-and-aft horizontal PTO shaft 53 are journalled in casing 120. Input shaft 51 is coupled to coaxial flywheel 1c of engine 1. Right and left output shafts 52 are coupled to respective coaxial input shafts 201 of right and left transaxles 200 via respective spline couplings 205. PTO shaft 53 is coupled to input shaft 6d of mower unit 6 via propeller shaft 38 and universal joints 37 and 39, similar to PTO shaft 14 of vehicle V1.

Spline coupling 205 is a sleeve having a splined inner peripheral surface and opposite open ends. In correspondence to spline coupling 205, end portions of output shaft 52 and input shaft 201 are splined on outer peripheral surfaces thereof. The end portion of output shaft 52 is spline-fitted into spline coupling 205 via one open end of spline coupling 205, and the end portion of input shaft 201 is spline-fitted into spline coupling 205 via the other open end of spline coupling 205, so that output shaft 52 and input shaft 201 are coupled to be rotatable integrally with each other. Incidentally, after the end portions of output shaft 52 and input shaft 201 are inserted into spline coupling 205, retaining rings or O-rings are fitted to the opposite ends of spline coupling 205 so as to prevent output shaft 52 and input shaft 201 from moving axially.

In vehicle V2, a flywheel housing 110 is interposed between a rear end of casing 120 of transmission 100 and a front end of engine 1 so as to incorporate engine output shaft 1b and flywheel 1c. A rear end portion of input shaft 51 projects rearward from a rear end of casing 120 into flywheel housing 110 and is coupled to a front end of flywheel 1c via damper 10 (not shown in this embodiment), similar to input shaft 11 of vehicle V1.

Figure 8:
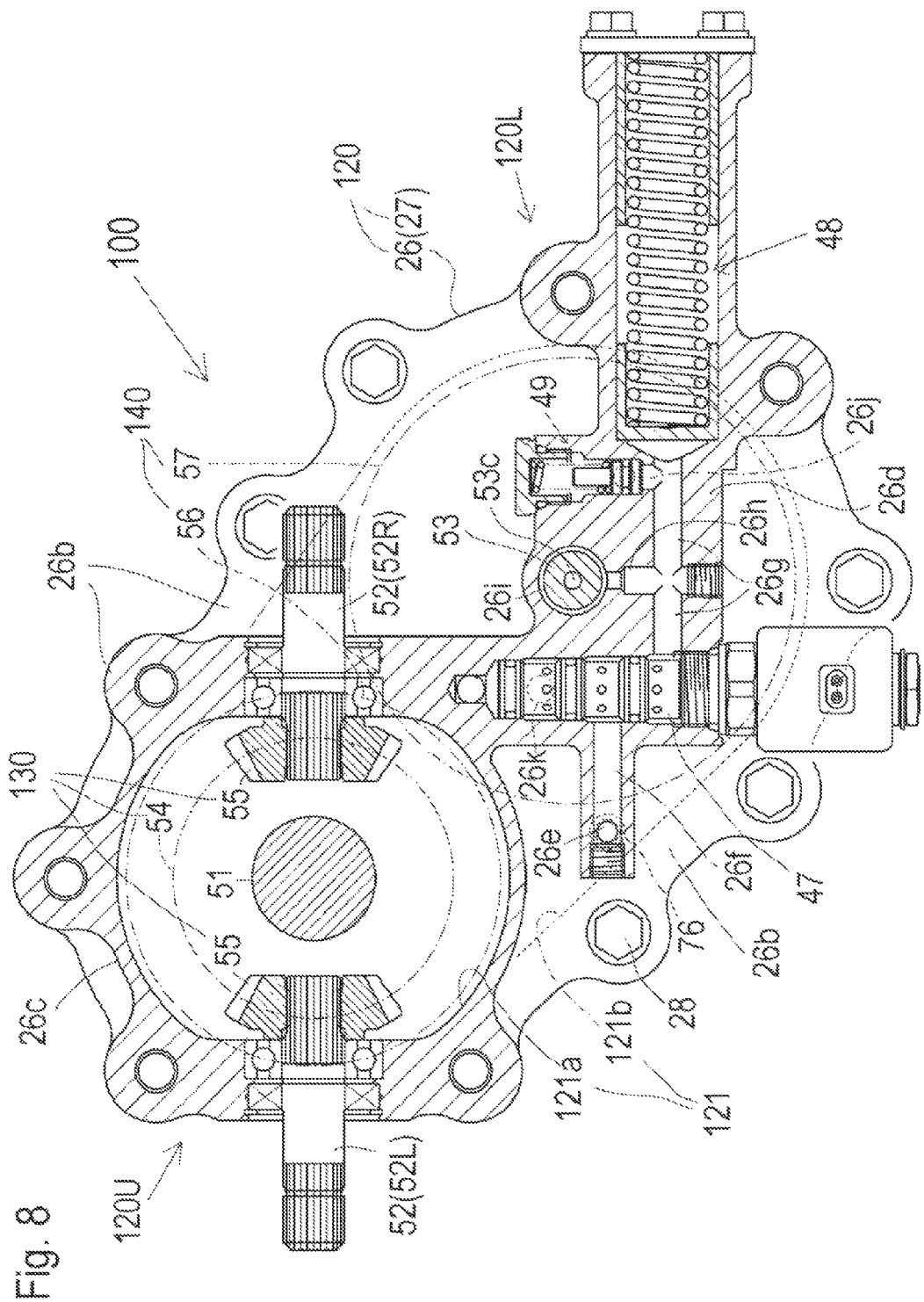
FIG. 8 is a sectional side view of the transmission according to the second embodiment.

Referring to FIGS. 4 and 8, transmission 100 will be described in detail. Casing 120 includes a first housing 26 and a second housing 27 disposed forward from first housing 26. First housing 26 journals right and left output shafts 52, and second housing 27 incorporates a later-discussed PTO clutch 150. A vertical joint surface of a front end of first housing 26 is joined to a vertical joint surface of a rear end of second housing 27. First housing 26 is formed at a rear end portion thereof with a flange 26a serving as a rear end of casing 120. Flange 26a is joined to a front end of flywheel housing 110. A rear end portion of input shaft 51 projects rearward from flange 26a. Therefore, the rear end portion of input shaft 51 is coupled to flywheel 1c in flywheel housing 110 in the condition that flange 26a is joined to flywheel housing 110.

As best understood from FIG. 5, casing 120 has an upper casing section 120U journaling input shaft 51, and has a lower casing section 120L journaling PTO shaft 53. Casing 120 is extended laterally (in this embodiment, rightward) slantwise from upper casing section 120U to lower section 120L. As shown in FIGS. 4 to 7, a hydraulic pump unit 70 and a working hydraulic pump unit 80 are mounted onto a front end surface of upper casing section 120U. A front end portion of PTO shaft 53 projects forward from lower casing section 120L.

Figure 6:
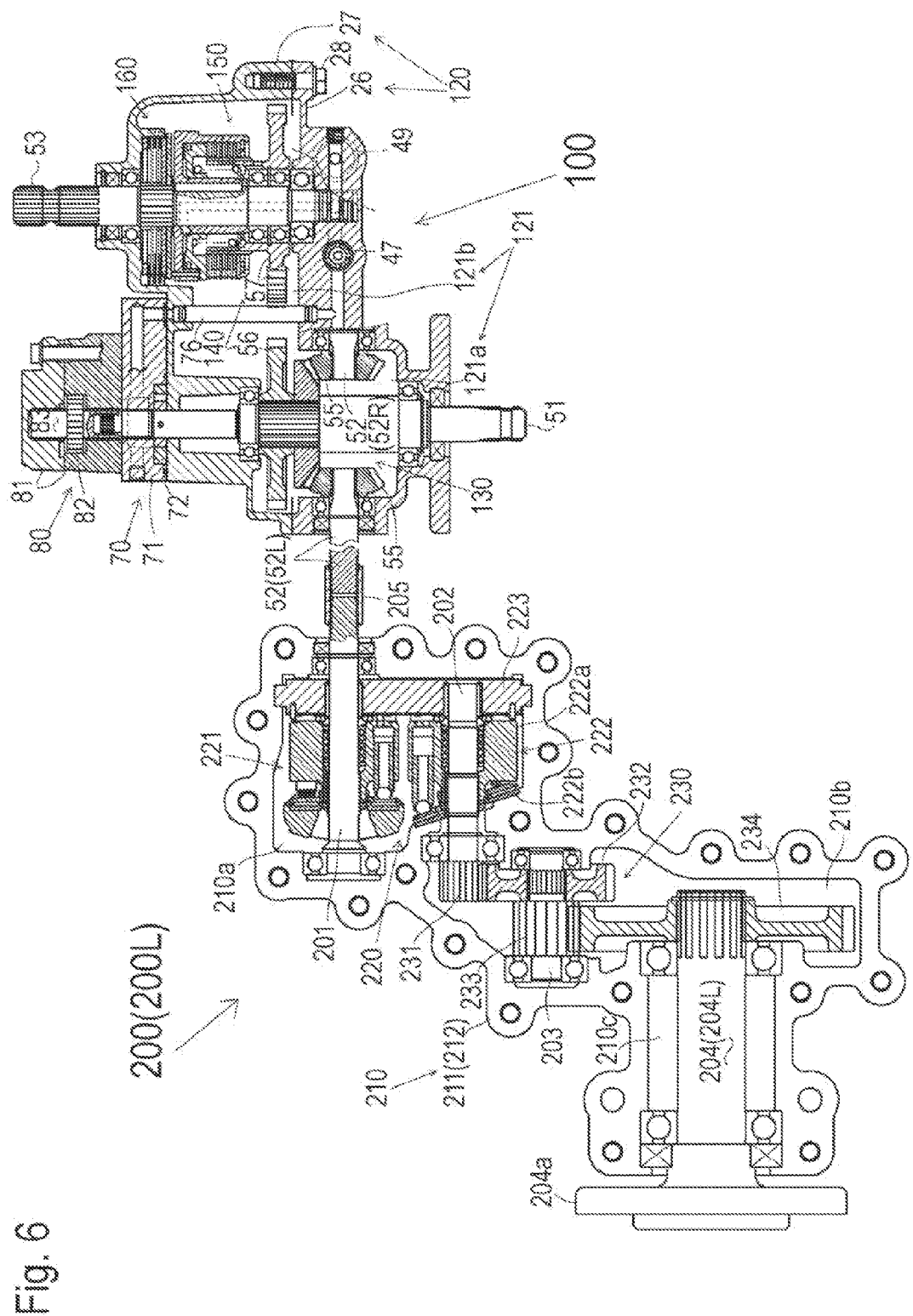
FIG. 6 is a developed sectional plan view of the transmission according to the second embodiment, with a sectional plan view of a transaxle connected to the transmission.
Figure 7:
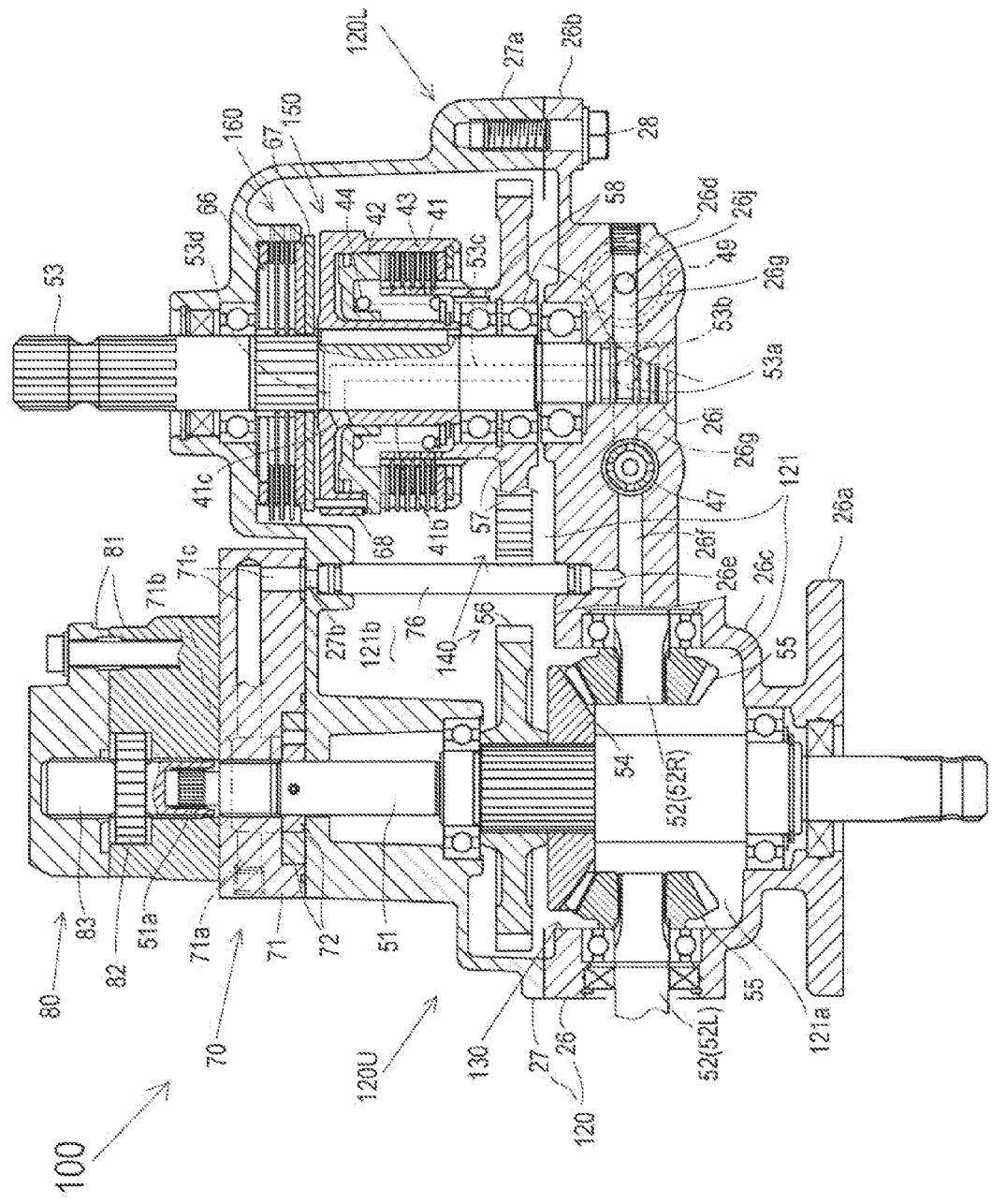
FIG. 7 is a developed sectional plan view of the transmission according to the second embodiment.

As shown in FIGS. 6 to 8, the rear end portion of first housing 26 formed with flange 26a to be joined to flywheel housing 110 is included by upper casing section 120U. A flange 26b to be joined to second housing 27 is formed at the front end of first housing 26 so as to extend from upper casing section 120U to lower casing section 120L.

As understood from FIG. 8, flange 26b of first housing 26 is formed at an outer peripheral edge portion thereof with bosses for bolts 28. On the other hand, as shown in FIG. 7, second housing 27 is formed with a flange 27a surrounding a rear end opening of second housing 27, and flange 27a is formed at an outer peripheral edge portion thereof with bosses corresponding to the bosses of flange 26b of first housing 26. The outer peripheral edge portion of flange 26b and the outer peripheral edge portion of flange 27a are joined to each other so as to join the bosses of flange 26b and the bosses of flange 27a to each other, and bolts 28 are inserted and screwed into the joined bosses, thereby fastening the front end of first housing 26 and the rear end of second housing 27 to each other.

In upper casing section 120U, first housing 26 is formed with a gear chamber portion 26c between rear flange 26a and front flange 26b. A space in gear chamber portion 26c is defined as a first gear chamber 121a for incorporating a first gear train 130. A front end of first gear chamber 121a is open. In upper casing section 120U, flange 26b is formed so as to surround the front end opening of first gear chamber 121a.

In lower casing section 120L, flange 26b is extended so as to entirely cover the front end of first housing 26. Further, in lower casing section 120L, first housing 26 is formed with a fluid duct block portion 26d extended rearward from flange 26b. A rear end portion of PTO shaft 53 is journalled in fluid duct block portion 26d.

Casing 120 constituted by joining first and second housings 26 and 27 defines a gear chamber 121 therein. Gear chamber 121 includes a first gear chamber 121a and a second gear chamber 121b. First gear chamber 121a is formed in first housing 26 in upper casing section 120U. Second gear chamber 121b is formed in second housing 27 over upper casing section 120U and lower casing section 120L. In upper casing section 120U, the front end opening of first housing 26 and the rear end portion of second housing 27 are joined to each other so that first gear chamber 121a and second gear chamber 121b are joined to each other so as to constitute continuous gear chamber 121.

First gear chamber 121a incorporates first gear train 130. First gear train 130 includes a bevel gear 54 fixed on input shaft 111, and right and left bevel gears 55 fixed on respective right and left output shafts 52 (right output shaft 52R and left output shaft 52L). Bevel gears 55 mesh with bevel gear 54.

Bevel gear 54 is fixed on input shaft 51 close to a front end of first gear chamber 121a joined to second gear chamber 121b. Right and left output shafts 52R and 52L are disposed symmetrically with respect to input shaft 51 so as to have axes at the same height with an axis of input shaft 51. Right and left output shafts 52R and 52L are extended laterally horizontally and coaxially to each other. Output shafts 52 are journalled via respective bearings by respective side walls of first housing 26 defining right and left end portions of first gear chamber 121a. In first gear chamber 121a, right bevel gear 55 fixed on a proximal (left) end portion of right output shaft 52L meshes with a right portion of bevel gear 54, and left bevel gear 55 fixed on a proximal (right) end portion of left output shaft 52R meshes with a left portion of bevel gear 54. Therefore, right and left output shafts 52R and 52L rotate opposite each other.

The rear end of second housing 27 is open over upper and lower casing sections 120U and 120L. Therefore, in upper casing section 120U, second gear chamber 121b is joined to first gear chamber 121a via the rear end opening of second housing 27 and the front end opening of first housing 26, and on the other hand, in lower casing section 120L, flange 26b serving as the front end wall surface of first housing 26 defines a rear end of second gear chamber 121b.

Spur gears 56 and 57 constituting a second gear train 140 is disposed in second gear chamber 121b along the rear end of second housing 27. Spur gear 56 is fixed on input shaft 51 so as to adjoin bevel gear 54 of first gear train 130. Spur gear 57 is fitted on PTO shaft 53 via a bearing 58 rotatably relative to PTO shaft 53 and meshes with spur gear 56.

In this embodiment, second gear train 140 consists of two spur gears 56 and 57 directly meshing with each other. Therefore, PTO shaft 53 rotates opposite input shaft 51.

Figure 11:
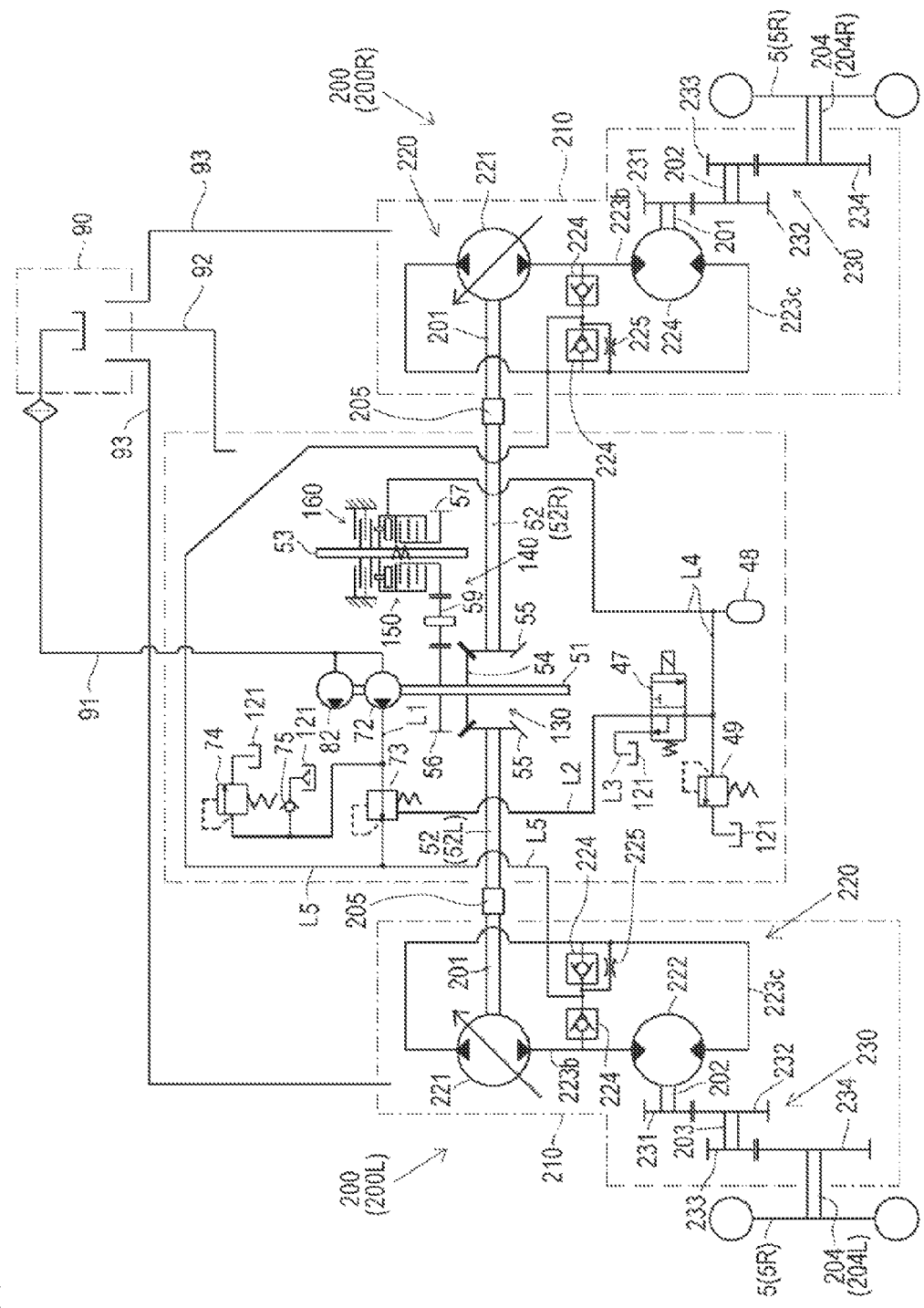
FIG. 11 is a skeleton diagram of a power train of the mower tractor equipped with the transmission according to the second embodiment, with a hydraulic circuit of the mower tractor.

Alternatively, an idle gear may be interposed between spur gears 56 and 57. In this regard, referring to FIG. 11 showing a skeleton diagram of a power train of transmission 100, second gear train 140 includes an idle gear 59 between spur gears 56 and 57. Due to the idle gear, PTO shaft 53 rotates in the same direction with input shaft 51. Further, the idle gear lowers lower casing section 120L journaling PTO shaft 53. In some cases, this lowering of lower casing section 120L may be advantageous to reduce a height difference between PTO shaft 53 and input shaft 6d of mower unit 6 so as to enhance the efficiency in power transmission to mower unit 6.

If an idle gear is interposed between spur gears 56 and 57, a later-discussed fluid pipe 76 may serve as an idle gear shaft, thereby unifying components for reducing the number of components and minimizing transmission 100.

In second gear chamber 121b in lower casing section 120L, a PTO clutch 150 and a PTO brake 160 are provided around PTO shaft 53. PTO clutch 150 makes and cuts off power transmission between spur gear 57 of second gear train 140 and PTO shaft 53. When PTO clutch 150 is engaged, the engine power transmitted from input shaft 51 to second gear train 140 is further transmitted to PTO shaft 53. When PTO clutch 150 is disengaged, PTO shaft 53 is isolated from the rotary power of second gear train 140 driven by the power of engine 1.

PTO clutch 150 is a wet multi-disc clutch including clutch drum 41, piston 42, friction discs 43 and spring 44, similar to PTO clutch 40 of transmission 2 shown in FIG. 3. A central boss portion of spur gear 57 is extended forward and is inserted into the rearwardly open clutch drum 41. Some of friction discs 43 are engaged to clutch drum 41 unrotatably relative to clutch drum 41, and the other of friction discs 43 are engaged to the central boss portion of spur gear 57 unrotatably relative to spur gear 57. Detailed description of other configuration of PTO clutch 150 is omitted because it is similar to PTO clutch 40.

Referring to FIGS. 4 to 8, hydraulic pump unit 70 is provided to supply hydraulic fluid to PTO clutch 150. Hydraulic pump unit 70 includes a fluid duct plate 71 and a pump 72 fitted in fluid duct plate 71. Fluid duct plate 71 is fixed to a front end surface of second housing 27 in upper casing section 120U. A front portion of input shaft 51 is extended through fluid duct plate 71 in the fore-and-aft direction so as to serve as a drive shaft of pump 72 in fluid duct plate 71. Pump 72 has any structure as far as it has all necessary functions. Pump 72 shown in FIG. 8 is a trochoid pump, including an inner rotor fixed on input shaft 51 and an outer rotor disposed around the inner rotor, and is disposed along the rear end of fluid duct plate 71, i.e., the front end surface of second housing 27 in upper casing section 120U.

A fluid duct structure of fluid duct plate 71 shown in FIGS. 6 to 8 will be described with reference to the hydraulic circuit diagram of FIG. 11. A gallery 71b is formed in fluid duct plate 71 close to input shaft 51 so as to face suction and delivery ports of pump 72. A suction duct 71a is extended in a direction (in this embodiment, leftward) from gallery 71b and has an open end at an outer side surface of fluid duct plate 71. This open end of suction duct 71a serves as a fluid suction port for receiving fluid from a reservoir tank 90, as discussed later with reference to FIG. 11.

A delivery duct 71c is extended in another direction (in this embodiment, rightward) from gallery 71b, is bent to extend rearward, and has an open end at the rear end surface of fluid duct plate 71. A connection duct 27b is formed in a wall of second housing 27 joined to the rear end surface of fluid duct plate 71 so as to extend horizontally rearward from the open end of delivery duct 71c. A fore-and-aft horizontal connection duct 26e is formed in flange 26b and fluid duct block portion 26d of first housing 26 so as to be coaxial to connection duct 27b. A horizontal fluid pipe 76 is extended in the fore-and-aft direction through second gear chamber 121b. A front end portion of fluid pipe 76 is fitted into the wall of second housing 27, and is joined to connection duct 27b. A rear end portion of fluid pipe 76 is fitted into a wall of first housing 26 defined as flange 26b and fluid duct block portion 26d, and is joined to connection duct 26e.

As shown in FIGS. 7 and 8, horizontal fluid ducts 26f and 26g are formed in fluid duct block portion 26d of first housing 26 and are extended in the lateral direction at different heights. An electromagnetic valve serving as PTO clutch switching valve 47 is fitted vertically upward into fluid duct block portion 26d and is interposed between fluid ducts 26f and 26g. Fluid duct 26f is joined to a suction port of PTO clutch switching valve 47, and fluid duct 26g is joined to a delivery port of PTO clutch switching valve 47.

As shown in FIGS. 7 and 8, the rear end of connection duct 26e is joined to fluid duct 26f. Accordingly, delivery duct 71c, fluid pipe 76, connection duct 26e and fluid duct 26f constitute a fluid passage L2, as shown in FIG. 11, for supplying fluid delivered from pump 72 to PTO clutch switching valve 47 via a later-discussed pressure reduction valve 73. As shown in FIG. 8, a drain duct 26k is extended forward from a tank port of PTO clutch switching valve 47 and is open to gear chamber 121 (second gear chamber 121b). Drain duct 26k serves as a fluid draining passage L3, as shown in FIG. 11, for draining fluid from the tank port of PTO clutch switching valve 47 to a fluid sump in gear chamber 121.

As shown in FIGS. 7 and 8, a forwardly open shaft hole 26i is recessed into flange 26b and fluid duct block portion 26d of first housing 26 in lower casing section 120L. A rear end portion of PTO shaft 53 is fitted into shaft hole 26i so as to be rotatable relative to first housing 26. A connection duct 26h is extended vertically downward from a fore-and-aft intermediate portion of shaft hole 26i to an intermediate portion of fluid duct 26g below shaft hole 26i. An axial fluid duct 52c is formed in an axial portion of PTO shaft 53 so as to extend horizontally in the fore-and-aft direction. An annular groove 53a is formed on an outer peripheral surface of the rear end portion of PTO shaft 53 in shaft hole 26i. A radial fluid duct 53b is formed in the rear end portion of PTO shaft 53 so as to extend from a rear end of axial fluid duct 53c, and is open to annular groove 53a. Therefore, fluid delivered from PTO clutch switching valve 47 is introduced into shaft hole 26i via fluid duct 26g and connection duct 26h, and the fluid in shaft hole 26i flows into axial fluid duct 53c in PTO shaft 53 via annular groove 53a and radial fluid duct 53b.

As shown in FIG. 7, a radial fluid duct 53d is formed in PTO shaft 53 so as to extend from a front end of axial fluid duct 53c, similar to radial fluid duct 12c in PTO clutch shaft 12 of transmission 2, and is joined to fluid duct 41c in central boss portion 41b of clutch drum 41 in PTO clutch 150. When fluid in axial fluid duct 53c is supplied to the clutch fluid chamber in clutch drum 41 of PTO clutch 150, piston 42 slides rearward against spring 44 so as to press friction discs 43, thereby engaging PTO clutch 150. When fluid is drained from the clutch fluid camber, piston 42 slides forward because of the biasing force of spring 44, friction discs 43 are separated from one another so as to disengage PTO clutch 150.

In this way, fluid duct 26g and connection duct 26h and shaft hole 26i formed in first housing 26 of casing 120, annular groove 53a and fluid ducts 53b, 53c and 53d formed on and in PTO shaft 53, and fluid duct 41c formed in central boss portion 41b of clutch drum 41 constitute a fluid passage L4, as shown in FIG. 11, for supplying the clutch fluid chamber of PTO clutch 150 with fluid for moving piston 42.

As shown in FIGS. 7 and 8, in lower casing section 120L, a laterally horizontal axial accumulator 48 is fitted into a right or left (in this embodiment, right) end portion of fluid duct block portion 26d and is joined to an end (in this embodiment, right end) portion of fluid duct 26g laterally opposite PTO clutch switching valve 47. Further, as shown in FIG. 8, a relief valve 49 is fitted downward into fluid duct block portion 26d. In fluid duct block portion 26d, a vertical connection duct 26j is extended upward from a portion of fluid duct 26g between the portion of fluid duct 26g joined to connection duct 26h and the portion of fluid duct 26g joined to accumulator 48. A top end of connection duct 26j is joined to a bottom end of relief valve 49, so that connection duct 26j is joined to relief valve 49. Therefore, fluid duct 26g regulates the flow of fluid in fluid duct 26g.

As understood from FIG. 11, PTO clutch switching valve 47 is switchable between an ON position and an OFF position. PTO clutch switching valve 47 is set at the ON position by exciting its solenoid, and is set at the OFF position by unexciting its solenoid. PTO clutch switching valve 47 shown in FIG. 11 is set at the OFF position so as to open its tank port, so that fluid from fluid passage L2 and fluid from its delivery port fluidly connected to fluid passage L4 are joined together in the tank port, and the joined fluid is drained to the fluid sump in gear chamber 121 via fluid draining passage L3 (i.e., drain duct 26k). In this state, the hydraulic pressure in fluid passage L4 is insufficient to thrust piston 42 against spring 44, so that piston 42 returns to its initial position defined by the biasing force of spring 44 so as to disengage PTO clutch 150. The return of piston 42 to the initial position causes fluid remaining in the clutch fluid chamber of PTO clutch 150 to flow out to fluid passage L4. Accumulator 48 stores the fluid from fluid passage L4, and relief valve 49 drains further surplus fluid to the fluid sump in gear chamber 121.

When PTO clutch switching valve 47 is switched to the ON position, PTO clutch switching valve 47 closes the tank port and supplies fluid passage L4 with all the flow of fluid from fluid passage L2. When the hydraulic fluid is supplied to PTO clutch 150 via fluid passage L4, relief valve 49 regulates the flow of hydraulic fluid supplied to PTO clutch 150 and drains surplus fluid to the fluid sump in gear chamber 121. In this way, the fluid in fluid passage L4, having the regulated flow, is supplied to the clutch fluid chamber of PTO clutch 150 so as to engage PTO clutch 150.

PTO brake 160 is provided on PTO shaft 53 in lower casing section 120L between the front end wall of second housing 27 and PTO clutch 150. PTO brake 160 includes brake discs 66, consisting of brake discs 66 engaged to PTO shaft 53 unrotatably relative to PTO shaft 53 and brake discs 66 engaged to second housing 27 unrotatably relative to second housing 27.

PTO brake 160 includes a pressure plate 67 disposed rearward from a rearmost end of brake discs 66. A fore-and-aft slidable connection rod 68 is passed through a front end portion of clutch drum 41 of PTO clutch 150. Pressure plate 67 is connected to piston 42 of PTO clutch 150 via connection rod 68.

When piston 42 slides forward to disengage PTO clutch 150, piston 42 pushes pressure plate 67 forward via connection rod 68, thereby pressing all brake discs 66 against one another. Therefore, brake discs 66 engaged to PTO shaft 53 are braked by brake discs 66 engaged to second housing 27, so that PTO shaft 53 is braked automatically when PTO clutch is disengaged, thereby preventing PTO shaft 53 from inertially rotating.

When piston 42 slides rearward to engage PTO clutch 150, piston 42 returns pressure plate 67 rearward via connection rod 68. Therefore, brake discs 66 engaged to PTO shaft 53 are separated from brake discs 66 engaged to second housing 27, so that PTO shaft 53 is unbraked so as to allow PTO shaft 53 to rotate automatically when PTO clutch 150 is engaged.

Referring to FIGS. 6 and 7, configuration of working hydraulic pump unit 80 will be described. A housing 81 of working hydraulic pump unit 80 is attached at a rear end thereof to a front end surface of fluid duct plate 71 of hydraulic pump unit 70. Housing 81 incorporates a pump 82. Pump 82 is a gear pump including a pair of gears meshing with each other. One gear is provided on a gear shaft 83 whose rear end portion is recessed with a splined recess. Input shaft 51 is formed on a front end thereof with a splined projection 51a. Splined projection 51a is fitted into the splined recess so that gear shaft 83 is connected to input shaft 51 so as to be rotatable integrally with input shaft 51.

Housing 81 has a delivery port (not shown) for taking out fluid delivered from pump 82. The fluid taken from the delivery port of working hydraulic pump unit 80 is supplied to an actuator for lifting mower unit 6 in vehicle V2, for example.

The hydraulic circuit for supplying hydraulic fluid to PTO clutch 150 by use of pump 72 of hydraulic pump unit 70 includes components other than those referred to as above and not shown in FIGS. 6 to 8. These components will be described.

Reservoir tank 90 for supplying fluid to pump 72 of hydraulic pump unit 70 is provided separately from transmission 100 and right and left transaxles 200. A fluid pipe 91 is extended to an open end of suction duct 71a in fluid duct plate 71. Incidentally, pump 82 is also supplied with fluid from fluid pipe 91. In this regard, continuous fluid ducts from suction duct 71a to a suction port of pump 82 may be formed in fluid duct plate 71 and housing 81, for example.

Pressure reduction valve 73 that is not shown in FIGS. 6 to 8 is connected to the delivery port of pump 72 via fluid passage L1. As discussed later, fluid whose pressure is regulated by pressure reduction valve 73 is charged to HSTs 220 in casings 210 of both transaxles 200. On the other hand, surplus fluid from pressure reduction valve 73 is supplied to PTO clutch switching valve 47 via fluid passage L2 including delivery duct 71c shown in FIG. 7.

Transmission 100 includes a relief valve 74 and fluid supplement check valve 75 connected to a portion of fluid passage L1 between pump 72 and pressure reduction valve 73. Relief valve 74 regulates flow of fluid in fluid passage L1. When engine 1 is not driven, fluid supplement check valve 75 sucks fluid from the fluid sump in gear chamber 121 and supplies fluid to HSTs 220 of transaxles 200 via pressure reduction valve 73, thereby preventing an accident such as unexpected descending of vehicle V2 on a slope because of gravitational rotation of drive wheels 5.

Pressure reduction valve 73, relief valve 74 and fluid supplement check valve 75 may be disposed at any appropriate positions in transmission 100. Fluid duct plate 71 can serve as an orthodox place for arranging these members.

Fluid pipe 91 from reservoir tank 90 is extended into casing 120 (gear chamber 121) of transmission 100 so as to supply fluid into casing 120, thereby lubricating gears and others of first and second gear trains 130 and 140. Respective fluid pipes 93 are extended from reservoir tank 90 to respective casings 210 of right and left transaxles 200 so as to pick up fluid from the fluid sumps in casings 210, or so as to regulate the quantity of the fluid sumps in casings 210.

Configuration of transaxle 200 will now be described. As shown in FIG. 4, half housings 211 and 212 are joined to each other so as to constitute casing 210 of transaxle 200.

Figure 9:
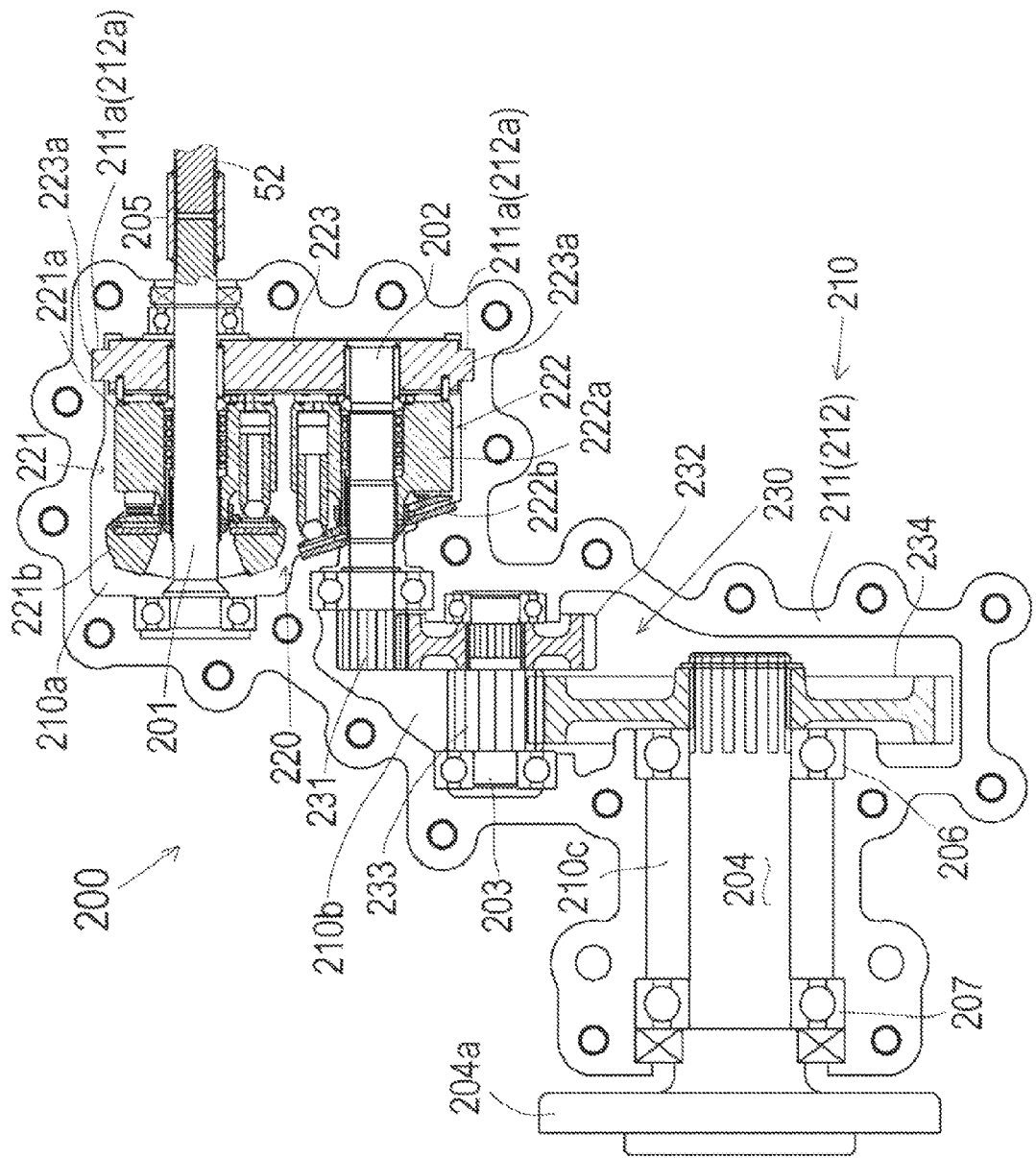
FIG. 9 is a sectional plan view of the transaxle shown in FIG. 6 configured to be connected to the transmission according to the second embodiment.

As shown in FIG. 9, casing 210 consisting of housings 211 and 212 joined to each other is formed therein with an HST chamber 210a for incorporating HST 220, a gear chamber 210b for incorporating a reduction gear train 230, and an axle chamber 210c for incorporating axle 204. In the condition that HST 220, reduction gear train 230 and axle 204 are disposed in HST chamber 210a, gear chamber 210b and axle chamber 210c, respectively, a lateral axis of a pump shaft 201 of a hydraulic pump 221 of HST 220 serving as input shaft 201 of transaxle 200, a lateral axis of an intermediate shaft 203 of reduction gear train 230, and a lateral axis of axle 204 are extended parallel to one another.

Housings 211 and 212 constituting casing 210 are formed symmetric with respect to a joint plane at which their proximal end surfaces are joined to each other. Halves of HST 220, reduction gear train 230 and axle 240 are disposed in housing 211 on one side from the joint plane, and the other halves of HST 220, reduction gear train 230 and axle 240 are disposed in housing 211 on the other side from the joint plane. Housings 311 and 312 constituting a casing 310 of another later-discussed transaxle 300 is configured similar to housings 211 and 212 as mentioned above.

Due to the above-mentioned configuration of transaxle 200, transaxle 200 that can serve as right transaxle 200R may be laterally reversed so as to serve as left transaxle 200L. In other words, common transaxle 200 is used as either right transaxle 200R or left transaxle 200L, thereby being standardized.

Referring to FIGS. 4 to 6 and 9, in this embodiment of transaxle 200, pump (input) shaft 201, a motor shaft 202, intermediate shaft 203 and axle 204 are linearly aligned in this order on the joint plane between housings 211 and 212, as best understood from FIG. 4. Pump shaft 201 and axle 204 has a considerably large distance therebetween because motor shaft 202 and intermediate shaft 203 are interposed between pump shaft 201 and axle 204. Therefore, transaxle 200 including shafts 201, 202, 203 and 204 aligned with one another is suitable to a vehicle having a considerably large distance (in either the vertical or lateral direction) between output shaft 52 of transmission 100 and axle 204 carried by transaxle 200.

Especially, in vehicle V2 as shown in FIG. 4, engine 1 is disposed between right and left drive wheels 5R and 5L, and transaxle 200 is disposed forward from engine 1. Therefore, as shown in FIG. 4, when vehicle V2 is viewed in side, output shafts 52 of transmission 100 coaxial to pump shafts 201 are disposed upwardly forward from the centers of drive wheels 5 coaxial to axles 204. Each casing 210 of transaxle 200 is located in vehicle V2 to adjust the alignment direction of shafts 201, 202, 203 and 204 on the joint plane between housings 211 and 212 so as to drivingly connect corresponding drive wheel 5 to corresponding output shaft 52 disposed at the above-mentioned position relative to the center of drive wheel 5.

In this way, the joint plane between housings 211 and 212, i.e., the alignment direction of shafts 201, 202, 203 and 204 does not have to be fore-and-aft horizontal or vertical. It may be located in any direction, e.g., slantwise in the vertical and fore-and-aft direction as shown in FIG. 4, so as to correspond to a height difference between output shaft 52 and axle 204 or another factor, thereby fixing each transaxle 200 to vehicle body frame 15.

Configuration of transaxle 200 will now be described, on an assumption that the joint plane between housings 211 and 212 is horizontal and shafts 201, 202, 203 and 204 are aligned in the fore-and-aft direction so as to place input shaft 201 at the foremost shaft of this alignment, as convenience for description. Further, in the lateral direction of each transaxle 200, one side toward transmission 100 is defined as a "proximal" side, and the other side toward corresponding drive wheel 5 is defined as a "distal" side.

On this assumption, a layout of HST chamber 210a, gear chamber 210b and axle chamber 210c as shown in FIG. 9 will be described. Casing 210 has a laterally proximal front portion and a laterally distal rear portion. HST chamber 210a is formed in the laterally proximal front portion of casing 210. Gear chamber 210b is formed in the laterally distal rear portion of casing 210. Axle chamber 210c is formed so as to extend laterally distally from a rear portion of gear chamber 210b.

HST 220 includes hydraulic pump 221, a hydraulic motor 222, and a center section 223. HST 220 is disposed in HST chamber 210a, so that hydraulic motor 222 is disposed rearward from hydraulic pump 221, and center section 223 is disposed laterally proximally from hydraulic pump 221 and hydraulic motor 222. Center section 223 is a flat plate having vertical surfaces at laterally proximal and distal ends thereof. A pump mounting surface and a motor mounting surface are formed on the laterally proximal vertical surface of center section 223. A cylinder block 221a of hydraulic pump 221 is rotatably and slidably mounted onto the pump mounting surface, and a cylinder block 222a of hydraulic motor 222 is rotatably and slidably mounted onto the motor mounting surface. Valve plates may be interposed between cylinder blocks 221a and 222a and the pump and motor mounting surfaces. Laterally horizontal pump shaft 201 serves as a rotary axial shaft of cylinder block 221a, and laterally horizontal motor shaft 202 serves as a rotary axial shaft of cylinder block 222a. Pump shaft 201 and motor shaft 202 are journalled by center section 223. Pump shaft 201 is extended through center section 223, so that a laterally proximal tip portion of pump shaft 201 projects outward from casing 210 laterally opposite cylinder block 221a, is disposed coaxially to a laterally distal end of corresponding output shaft 52 of transmission 100, and is drivingly connected to output shaft 52 rotatably integrally with output shaft 52. Housings 211 and 212 are formed with respective recesses into which half portions of the pump and motor mounting surfaces of center section 223.

Referring to FIG. 9, center section 223 is formed with engaging projection 223a, and housings 211 and 212 are formed with engaging recesses 211a and 212a, respectively. When housings 211 and 212 are joined to each other, respective engaging recesses 211a and respective engaging recesses 212a are joined to each other so as to form respective continuous engaging recesses. Engaging projections 223a are fitted into the respective continuous engaging recesses so as to engage center section 223 to housings 211 and 212. More specifically, before the joining of housings 211 and 212, a half portion of center section 223 is inserted into housing 211, for example, so that half portions of respective engaging projections 223a are fitted into respective engaging recesses 211a of housing 211. Then, housing 212 is joined to housing 211 so as to cover the remaining half portion of center section 223, whereby engaging recesses 212a of housing 212 are joined to respective engaging recesses 211a of housing 211. At this time, the remaining half portions of engaging projections 223a of center section 223 are fitted into the respective remaining half portions of engaging recesses 212a, so that center section 223 is engaged to housings 211 and 212 as mentioned above. Therefore, center section 223 is prevented from moving in casing 210 constituted by housings 211 and 212 joined to each other.

Each hydraulic pump 221 includes a movable swash plate 221b that is disposed laterally distally from corresponding cylinder block 221a so as to be pressed against heads of plungers fitted in cylinder block 221a. Movable swash plates 221b of respective hydraulic pumps 221 are operatively connected to respective right and left control levers 8R and 8L as shown in FIGS. 4 and 5, mechanically via a mechanical link, or electrically via a controller. Each control lever 8 is operated to control the tilt direction and angle of corresponding movable swash plate 221b so as to control the delivery direction and amount of fluid from corresponding hydraulic pump 221 to corresponding hydraulic motor 222, thereby controlling the rotary direction and speed of corresponding motor shaft 202.

Each hydraulic motor 222 includes a fixed swash plate 222b that is disposed laterally distally from corresponding cylinder block 222a so as to be pressed against heads of plungers fitted in cylinder block 222a. Alternatively, a movable swash plate may serve as the swash plate of hydraulic motor 222 so that the output rotary speed of corresponding motor shaft 202 may be changed by moving the tilt angle of the swash plate.

A hydraulic circuit of HST 220 will be described with reference to FIG. 11. A pair of fluid passages 223b and 223c are formed in center section 223 so as to be interposed between hydraulic pump 221 and hydraulic motor 222 in the condition that hydraulic pump 221 and hydraulic motor 222 are mounted to center section 223. Since main fluid passages 223b and 223c for fluidly connecting hydraulic pump 221 to hydraulic motor 222 are formed in center section 223 that is disposed in casing 210 of transaxle 200, HST 220 is advantageous in durability, compactness, reduction of components in number, ease of assembly and the like, in comparison with a conventional HST in which a hydraulic pump and a hydraulic motor are fluidly connected to each other via pipes.

Center section 223 is provided therein with a pair of charge check valves 224 for respective main fluid passages 223b and 223c. The flow of fluid in main fluid passage 223b or 223c becomes insufficient, corresponding charge check valve 224 is opened to supply fluid to main fluid passages 223b and 223c. One of charge check valves 224 is bypassed by a neutral-expanding orifice 225. Both charge check valves 224 may be bypassed by respective neutral-expanding orifice 225.

The fluid delivered from hydraulic pump unit 70 and having a pressure regulated by pressure reduction valve 73 is supplied to both charge check valves 224 of each HST 220 via fluid passage L5. A fluid pipe may be extended from fluid duct plate 71 of hydraulic pump unit 70 to casing 210 of each transaxle 200 via fluid passage L5. As mentioned above, the fluid sumps in casings 210 of right and left transaxles 200 are fluidly connected to reservoir tank 90 via respective fluid passages 93, e.g., fluid pipes.

Reduction gear train 230 and axle 204 in each transaxle 200 will be described with reference to FIGS. 4 to 6, 9 and 11. A laterally distal tip portion of motor shaft 202 of hydraulic motor 222 disposed in a rear portion of HST chamber 210a is extended from HST chamber 210a and projects into a front portion of gear chamber 210b so as to be fixedly provided (or formed) thereon with a pinion 231.

Axle 204 is disposed in axle chambers 210c and is journalled at laterally proximal and distal portions of axle chamber 210c via respective bearings 206 and 207 between housings 211 and 212. A laterally proximal end portion of axle 204 projects from bearing 206 into a rear portion of gear chamber 210b joined to a lateral proximal end of axle chamber 210c. In the rear portion of gear chamber 210b, a bull gear 234 is fixed on the lateral proximal end portion of axle 204. A laterally distal end portion of axle 204 is extended distally outward from casing 210 so as to be provided thereon with a flange-shaped hub 204a adapted to be fixed to a rim of corresponding drive wheel 5.

Right and left ends of each laterally horizontal intermediate shaft 203 is supported at right and left sides of gear chamber 210b so as to be sandwiched between housings 211 and 212. A diametrically large intermediate gear 232 and a diametrically small intermediate gear 233 are fixed (or formed) on intermediate shaft 203 in gear chamber 210b. A front end of intermediate gear 232 meshes with a rear end of pinion 231 that is diametrically smaller than intermediate gear 232. Intermediate gear 233 is disposed on a lateral distal side of intermediate gear 232 so as to adjoin intermediate gear 232. A rear end of intermediate gear 233 meshes with a front end of bull gear 234 that is diametrically larger than intermediate gear 233. Incidentally, a parking lock mechanism (not shown in FIG. 9) for optionally locking motor shaft 202 is disposed in casing 210. The parking lock mechanism includes pawls that can mesh with teeth of pinion 231.

On the above-mentioned assumption that the joint plane between housings 211 and 212, i.e., the alignment of shafts 201, 202, 203 and 204, is horizontal and pump shaft 201 is disposed at the foremost of the alignment, when each transaxle 200 having the above-mentioned structure is viewed in side, hydraulic motor 222 in the rear portion of HST chamber 210a and pinion 231 in the front portion of gear chamber 210b overlap each other coaxially. Hydraulic pump 221 is disposed forward from hydraulic motor 222 and pinion 231, intermediate shaft 203 and intermediate gears 232 and 233 on intermediate shaft 203 are disposed rearward from hydraulic motor 222 and pinion 231, and axle 204 and bull gear 234 on axle 204 are disposed rearward from intermediate shaft 203 and gears 232 and 233. In other words, hydraulic pump 221 of HST 220 and the rear portion of reduction gear train 230 rearward from intermediate shaft 203 do not overlap each other so that they are distributed forward and rearward with respect to hydraulic motor 222 and motor shaft 202.

On the other hand, when each transaxle 200 is viewed in front or rear, in gear chamber 210b, the laterally distal end portion of motor shaft 202 and pinion 231 on this portion of motor shaft 202 and the laterally proximal end portion of axle 204 and bull gear 234 on this portion of axle 204 overlap intermediate shaft 203 and intermediate gears 232 and 233 on intermediate shaft 203. HST 220 is disposed on the laterally proximal side of reduction gear train 230, and axle 204 is extended laterally distally from reduction gear train 230. In other words, HST 220 does not overlap reduction gear train 230 and axle 204 except that motor shaft 202 is extended laterally distally so as to have pinion 231 on its laterally distal end portion, thereby being distributed rightward or leftward from reduction gear train 230 and axle 204.

More specifically, intermediate gears 232 and 233 are distributed on intermediate shaft 203 rightward and leftward. When each transaxle 200 is viewed in front or rear, laterally proximal intermediate gear 232 and pinion 231 disposed on the laterally distal end portion of motor shaft 202 to mesh with intermediate gear 232 do not overlap bull gear 234 disposed on the laterally proximal end portion of axle 204 to mesh with laterally distal intermediate gear 233, thereby being distributed rightward or leftward from bull gear 234. Therefore, in casing 210 of this embodiment, the front portion of gear chamber 210b only has a small space for incorporating the laterally distal end portion of motor shaft 202 and pinion 231 thereon. However, the space as the front portion of gear chamber 210b may be expanded to enable bull gear 234 to be disposed forward from intermediate gear 233.

Figure 10:
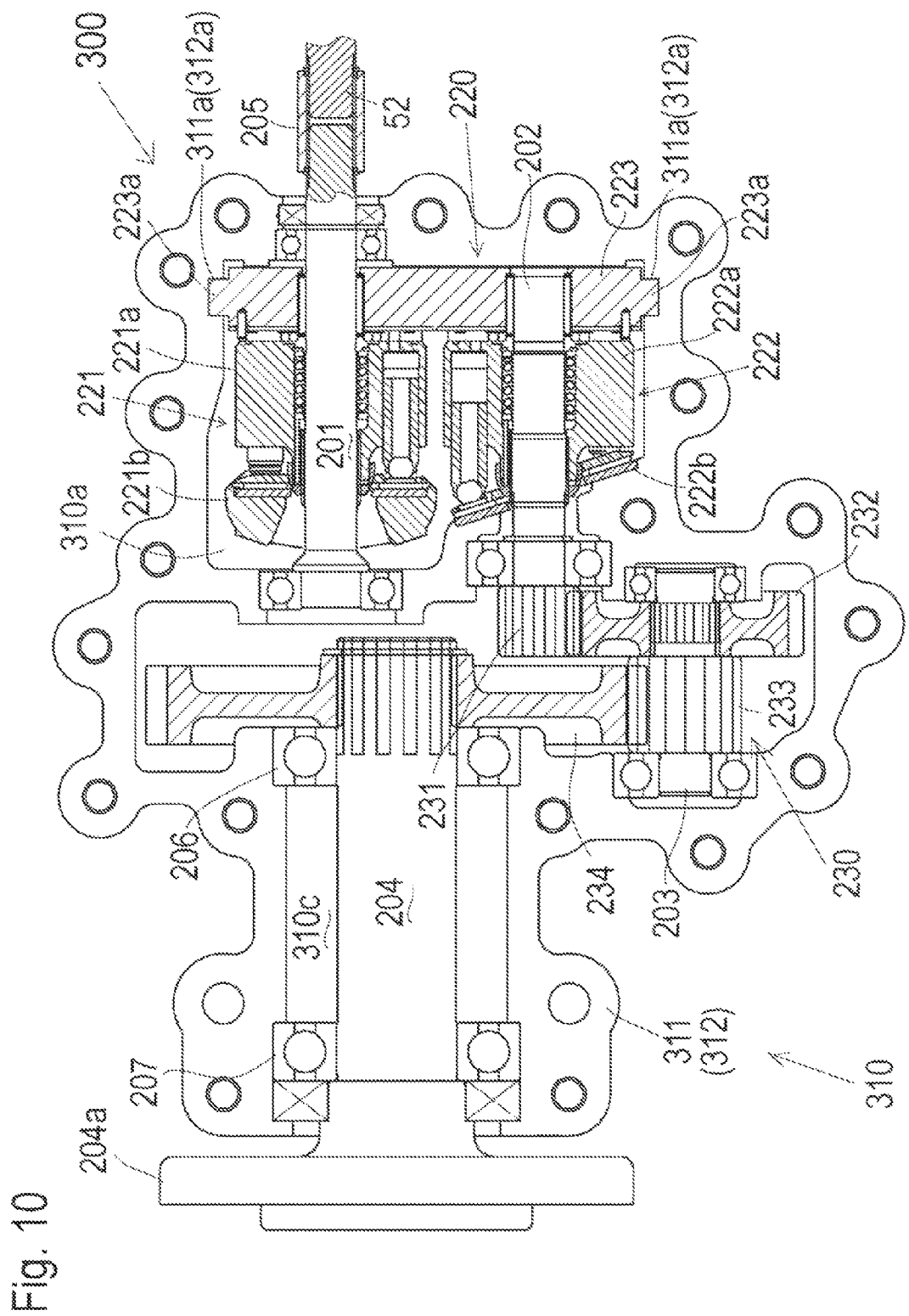
FIG. 10 is a sectional plan view of another transaxle configured to be connected to the transmission according to the second embodiment.

A transaxle 300 shown in FIG. 10 serves as modified transaxle 200. A casing 310 of transaxle 300 is formed to expand the space forward from intermediate gear 232 in the gear chamber so as to accommodate bull gear 234. Configuration of transaxle 300 in comparison with transaxle 200 will be described.

Casing 310 of transaxle 300 includes housing 311 and 312 joined to each other. Components of HST 220 and reduction gear train 230 and axle 204 identical to those of transaxle 200 are disposed in casing 310. All laterally axial shafts 201, 202, 203 and 204 are arranged on the joint plane between housings 311 and 312, similar to those of transaxle 200. Input (pump) shaft 201 projects from a laterally proximal end of casing 310, and axle 204 projects from a laterally distal end of casing 310, and the lateral width of casing 310 between the laterally proximal and distal ends of casing 310 is substantially equal to that of casing 210. In other words, if the lateral width between the distal end of each output shaft 52 of transmission 100 and the corresponding drive wheel 5 is suitable to arrange transaxle 200 in the space defined by the lateral width, it is also suitable to arrange transaxle 300.

The following description stands on the assumption that both transaxles 200 and 300 are disposed so that the joint plane between housings 211 and 212 of casing 210 and the joint plane between housings 311 and 312 of casing 310 are horizontal and so that hydraulic pump 221 is disposed forward from hydraulic motor 222, except for a case that some special mention is given.

In casing 210 of transaxle 200, HST chamber 210a is disposed on the laterally proximal side of the front portion of reduction gear chamber 210b extended in the fore-and-aft direction, and axle chamber 210c is disposed on the laterally distal side of the rear portion of reduction gear chamber 210b, so that HST chamber 210a and axle chamber 210c are offset forward and rearward. On the contrary, casing 310 of transaxle 300 constituted by joining housings 311 and 312 is formed so as to have HST chamber 310a, reduction gear chamber 310b and axle chamber 310c aligned in the lateral direction. Therefore, when vehicle V2 equipped with transaxles 300 is viewed in side, HST 220, reduction gear train 230 and axle 204 overlap one another, so that a distance between each input (pump) shaft 201 of transaxle 300 coaxial to output shaft 52 and axle 204 is greatly small. Therefore, transaxle 200 is preferred if transmission 100 and drive wheels 5 are arranged in vehicle V2 so as to have a large vertical or fore-and-aft distance between output shafts 52 and axles 204 when vehicle V2 is viewed in side. On the contrary, transaxle 300 is preferred if transmission 100 and drive wheels 5 in vehicle V2 are arranged so as to have a small vertical or fore-and-aft distance between output shafts 52 and axles 204 when vehicle V2 is viewed in side.

Arrangement of HST 220, reduction gear train 230 and axle 204 in transaxle 300 will be described. HST 220 includes hydraulic pump 221, hydraulic motor 222 and center section 223, and is disposed in HST chamber 310a in a laterally proximal portion of casing 310, similar to HST 220 disposed in HST chamber 210a in casing 210 of transaxle 200. Housings 311 and 312 are formed with engaging recesses 311a and 312a similar to engaging recesses 211a and 212a of housings 211 and 212. Engaging projections 223a of center section 223 are fitted into engaging recesses 311a and 312a joined to each other by joining housings 311 and 312 to each other. A laterally proximal end portion of motor shaft 202 is extended from hydraulic motor 222 in a rear portion of HST chamber 310a into gear chamber 310b at a laterally middle portion of casing 310. Pinion 231 is fixed (or formed) on the laterally proximal end portion of motor shaft 202.

In gear chamber 310b, intermediate shaft 203 is disposed rearward from motor shaft 202, diametrically large intermediate gear 232 is fixed (or formed) on intermediate shaft 203, and diametrically small intermediate gear 233 is fixed (or formed) on intermediate shaft 203. The front end of intermediate gear meshes with the rear end of pinion 231 on motor shaft 202. In the arrangement of HST 220 and reduction gear train 230 in casing 310 of transaxle 300, a layout of pinion 231 on motor shaft 202 and intermediate gear 232 on intermediate shaft 203 is similar to the corresponding layout in casing 210 of transaxle 200.

In transaxle 200, axle 204 is disposed rearward from intermediate shaft 203 so that the rear end of intermediate gear 233 meshes with the front end of bull gear 234 on the laterally proximal end portion of axle 204 in gear chamber 210b. On the contrary, in transaxle 300, axle 204 is disposed forward from intermediate shaft 203, so that a front end of intermediate gear 233 meshes with a rear end of bull gear 234 on the laterally proximal end portion of axle 204 in gear chamber 210b. In this regard, as mentioned above, casing 210 of transaxle 200 is formed so as to expand the rear portion of gear chamber 210b rearward from laterally distal intermediate gear 233 on intermediate shaft 203, thereby ensuring the large space for bull gear 234 in the rear portion of gear chamber 210b. On the contrary, as mentioned above, casing 310 of transaxle 300 is formed so as to expand the front portion of gear chamber 310b forward from intermediate gear 233, thereby ensuring the large space for bull gear 234 in the front portion of gear chamber 310b.

When transaxle 300 is viewed in front or rear, bull gear 234 meshing with intermediate gear 233, and pinion 231 disposed on the laterally distal end portion of motor shaft 202 to mesh with intermediate gear 232 do not overlap each other, thereby being distributed rightward and leftward. Conversely, on the assumption that the layout of HST 220, pinion 231 on the laterally distal end portion of motor shaft 202 extended from HST 220, intermediate shaft 203 and intermediate gears 232 and 233 is kept, the layout of HST 220, reduction gear train 230 and axle 204 corresponds to casing 210 of transaxle 200 if axle 204 and bull gear 234 on the laterally proximal end portion of axle 204 are disposed rearward from intermediate shaft 203. On the same assumption, the layout of HST 220, reduction gear train 230 and axle 204 corresponds to casing 310 of transaxle 300 if axle 204 and bull gear 234 on the laterally proximal end portion of axle 204 are disposed forward from intermediate shaft 203. Therefore, all the components, except for the casing, can be shared between transaxle 200 having axles 204 distant from output shafts 52 of transmission 100 when vehicle V2 is viewed in side, and transaxle 300 having axle 204 close to output shafts 52 of transmission 100 when vehicle V2 is viewed in side, thereby reducing costs.

The above-mentioned embodiments are described as being adaptable to the zero-turn working vehicle. However, an adaptable working vehicle is not limited to the zero-turn vehicle. The transmission according to the invention includes the horizontal input shaft adaptable to be drivingly connected to a horizontal engine, and the horizontal PTO shaft adapted to be drivingly connected to a working device via the propeller shaft and universal joints. The transmission is adaptable to any working vehicle only if this arrangement of the input shaft and the PTO shaft is ensured in the vehicle.

It is further understood by those skilled in the art that the foregoing description is given to preferred embodiments of the disclosed apparatus and that various changes and modifications may be made in the invention without departing from the scope thereof defined by the following claims.

What is claimed is:

1. A transmission for a working vehicle, the working vehicle being equipped with an engine having a horizontal engine output shaft, a pair of transaxles for driving respective right and left drive wheels at variable speeds, and a working device, and the transmission comprising:
    a horizontal input shaft, wherein an axial end of the input shaft serves as a joint configured to connect to a flywheel of the engine;
    an output shaft configured to drivingly connect to the transaxles;
    a first gear train for transmitting power from the input shaft to the output shaft;
    a horizontal PTO shaft extended parallel to the input shaft, wherein the PTO shaft is provided with a universal joint configured to connect to the working device;
    a second gear train for transmitting power from the input shaft to the PTO shaft;
    a PTO clutch for making and cutting off a power transmission between the input shaft and the PTO shaft; and
    a common casing supporting the input shaft and the output shaft and incorporating the first and second gear trains and the PTO clutch.

2. The transmission according to claim 1,
    wherein the casing is provided at a side end thereof with a mounting flange to be joined to the engine.

3. The transmission according to claim 1,
    wherein the first gear train has a gear ratio such as to substantially equalize a rotary speed of the output shaft to a rotary speed of the input shaft, and
    wherein the second gear train has a gear ratio such as to make a rotary speed of the PTO shaft less than the rotary speed of the input shaft.

4. The transmission according to claim 1,
wherein the first gear train includes a pair of bevel gears, so that the output shaft drivingly connected to the input shaft via the first gear train is extended coaxially to input shafts of the respective transaxles and is drivingly connected to the input shafts of the transaxles via a belt.

5. The transmission according to claim 4,
wherein the casing is provided with a vertically downwardly extended portion at an end thereof opposite the engine, so that the vertically downwardly extended portion supports the PTO shaft, and
wherein the output shaft is journalled vertically at a portion of the casing between an end of the casing to be joined to the engine and the vertically downwardly extended portion.

6. The transmission according to claim 1,
wherein a pair of horizontal output shafts each of which serves as said output shaft are extended laterally of the working vehicle and project laterally outward from right and left ends of the casing, and
wherein the first gear train includes a first bevel gear fixed on the input shaft of the transmission and second bevel gears fixed on the respective output shafts and meshing with the first bevel gear, so that the output shafts drivingly connected to the input shaft via the first gear train are extended coaxially to respective input shafts of the transaxles so as to be drivingly connected to the respective input shafts of the transaxles.

* * * * *